(12) United States Patent  
Mori

(10) Patent No.: US 8,798,462 B2  
(45) Date of Patent: Aug. 5, 2014

(54) OPTICAL PACKET SWITCHING SYSTEM

(75) Inventor: Shota Mori, Kawasaki (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 252 days.

(21) Appl. No.: 13/474,577

(22) Filed: May 17, 2012

(65) Prior Publication Data

US 2012/0301139 A1 Nov. 29, 2012

(30) Foreign Application Priority Data

May 24, 2011 (JP) ................................ 2011-116301

(51) Int. Cl.  
*H04B 10/08* (2006.01)

(52) U.S. Cl.  
USPC .................. 398/26; 398/45; 398/54; 398/52; 398/25

(58) Field of Classification Search  
CPC .............. H04B 10/07953; H04Q 11/0001; H04Q 11/0005; H04J 14/0212  
USPC .......... 398/26, 25, 45, 50, 51, 52, 54  
See application file for complete search history.

(56) References Cited

U.S. PATENT DOCUMENTS

| | | | |
|---|---|---|---|
| 6,839,131 B2 * | 1/2005 | Kwon | 356/73.1 |
| 7,317,873 B2 * | 1/2008 | Aoki | 398/45 |
| 7,715,709 B2 * | 5/2010 | Amemiya et al. | 398/12 |
| 7,756,417 B2 * | 7/2010 | Takeuchi et al. | 398/17 |
| 7,873,283 B2 * | 1/2011 | Akiyama et al. | 398/147 |
| 8,665,170 B2 * | 3/2014 | Bishop et al. | 343/826 |
| 2002/0109879 A1 * | 8/2002 | Wing So | 359/118 |
| 2002/0171889 A1 * | 11/2002 | Takeuchi et al. | 359/124 |
| 2010/0322622 A1 * | 12/2010 | Shukunami et al. | 398/26 |
| 2012/0163804 A1 * | 6/2012 | Xia et al. | 398/25 |
| 2012/0201533 A1 * | 8/2012 | Gariepy et al. | 398/26 |
| 2013/0016967 A1 * | 1/2013 | Sato | 398/26 |
| 2013/0039650 A1 * | 2/2013 | Sato | 398/26 |

FOREIGN PATENT DOCUMENTS

JP 2008-235986 A 10/2008

* cited by examiner

*Primary Examiner* — Daniel Washburn  
*Assistant Examiner* — Hibret Woldekidan  
(74) *Attorney, Agent, or Firm* — Christie, Parker & Hale, LLP

(57) ABSTRACT

An optical packet switching system includes an optical packet generator for generating an optical packet signal, an optical packet switching unit, provided with an optical switch, for switching the route of an inputted optical packet signal by controlling on/off of the optical switch, and an optical signal-to-noise ratio measuring unit for measuring the optical signal-to-noise ratio of the optical packet signal outputted from the optical packet switching unit. When switching the route of the optical packet signal, the optical packet switching unit outputs an optical packet signal with optical noise by keeping the optical switch on longer than the time width of the packet signal. The optical signal-to-noise ratio measuring unit measures the optical signal power and the optical noise power, respectively, in the optical packet signal with optical noise and measures the optical signal-to-noise ratio by calculating the ratio between the optical signal power and the optical noise power.

17 Claims, 24 Drawing Sheets

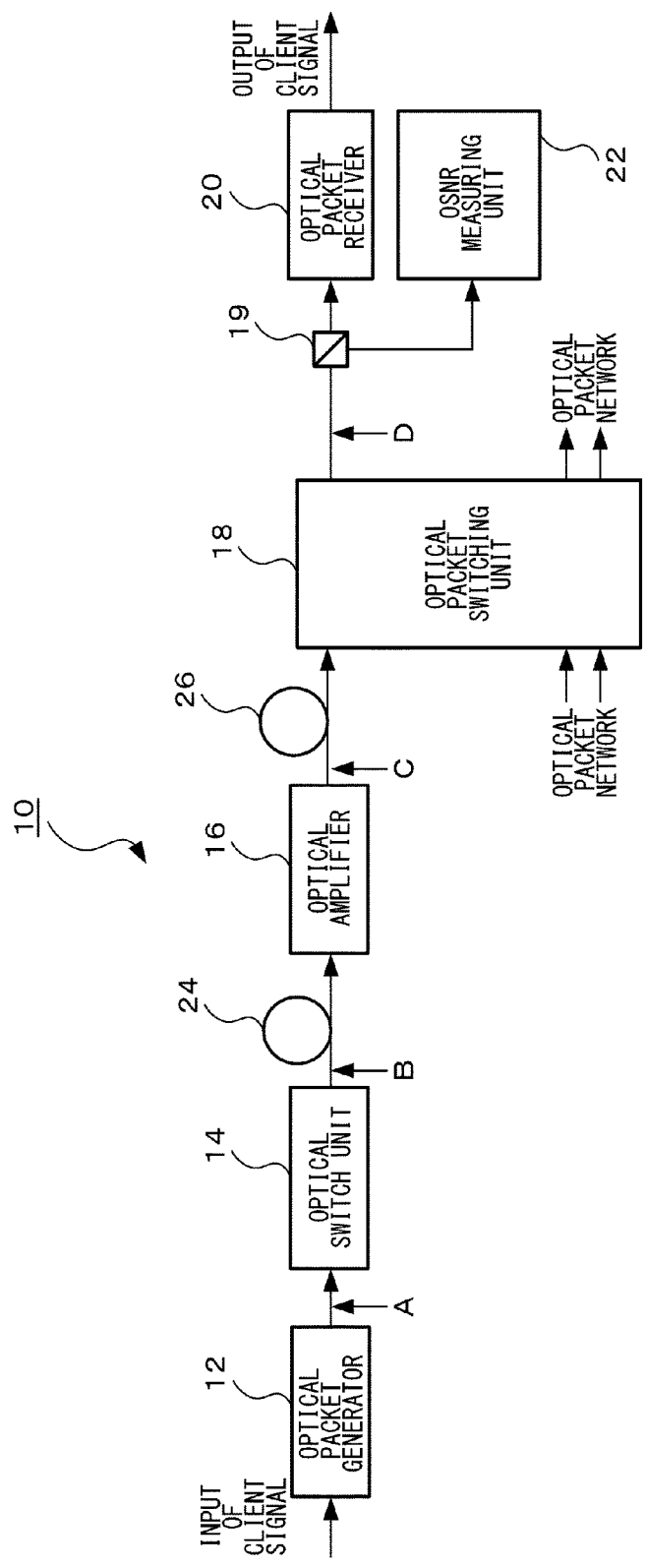

OPTICAL PACKET SWITCHING SYSTEM

CROSS-REFERENCE TO RELATED APPLICATION

This application claims priority to and the benefit of Japanese Patent Application Number 2011-116301, filed on May 24, 2011, the entire disclosure of which is incorporated herein by reference.

BACKGROUND OF THE INVENTION

1. Field of the Invention

The present invention relates to an optical packet switching system that enables packet switching for each optical packet by switching an optical switch according to destination information given to an optical packet signal.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 GEther (10 Gigabit Ethernet (registered trademark) signal and the like), for example, is used as a small unit with which the switching is performed, and each is converted into the form of an optical packet and then the route is switched by an ultrahigh-speed optical switch (see Reference (1) in the following Related Art List, for instance).

The IP packet does not transfer any significant information in the absence of data therein, so that the bandwidth corresponding thereto is wasted. However, if the optical packet switching system is realized, then the time slot of a packet where data is absent can be occupied by another packet. Therefore, the optical packet switching system is considered a promising technology of the future which is capable of markedly enhancing the bandwidth usage efficiency of the transmission path.

RELATED ART LIST (1) Japanese Unexamined Patent Application Publication No. 2008-235986.

It is known that long-distance and multi-relay optical transmission systems employ optical amplifiers to make up for the transmission losses. This is because the use of optical amplifiers can assure longer transmission distances without optical-to-electrical (O/E) and electrical-to-optical (E/O) conversions. However, the transmission distance cannot be extended indefinitely by optical amplification; an optical signal-to-noise ratio (OSNR) gets degraded whenever the transmission passes through an optical amplifier. In a sense, therefore, the optical signal-to-noise ratio is the most important parameter that determines a bit error rate (BER). Hence, the line quality of a system can be verified by measuring the optical signal-to-noise ratio. Further, in practice in wavelength multiplexing optical transmitting systems is a technique called "pre-emphasis control" in which an attempt to realize uniformity in noise quality for all the wavelengths is made by measuring the optical signal-to-noise ratio of each wavelength and raising the power of wavelengths with low optical signal-to-noise ratio at a transmitting end.

In the conventional system using path switching per wavelength (hereinafter referred to as "optical path system"), the optical signal power is constant since the mark rate of optical signal is kept at 50%. Also, the same applies to a optical noise. For example, a certain optical signal keeps passing through the same optical amplifier, so that the noise of the optical signal is constant. Accordingly, the optical signal-to-noise ratio can be measured by measuring each of the optical signal power and the optical noise power and calculating the ratio of the optical signal power over the optical noise power.

FIG. 1 is a diagram for explaining a method of measuring the optical signal-to-noise ratio as an example. As shown in FIG. 1, a light spectrum with optical signal and optical noise mixed with each other is measured. And the peak power of the signal wavelength is measured for the optical signal, whereas the power at a point slightly apart from the wavelength of the optical signal is measured for the optical noise. In an optical path system, the powers of the optical signal and the optical noise are constant irrespective of the bit rate and the like of the optical signal, so that the optical signal-to-noise ratio can be measured using a low-speed light spectrum analyzer.

In optical packet switching systems, too, it is desirable that the optical signal-to-noise ratio be measured since it is a very important performance index as with optical path systems. However, there is a problem with the optical packet switching systems that the same measuring method as with the optical path systems cannot be employed to get correct measurement results for reasons peculiar to the optical packets. The reasons are as described below.

FIG. 2 is a diagram for explaining a problem with the measurement of the optical signal-to-noise ratio in an optical packet switching system. In the optical packet switching system, a destination address is attached to each optical packet, and the optical packets are transferred as they are switched according to the destinations. Thus, the optical packets passing through a certain measurement point have arrived at the point from various transmitting stations, and therefore a plurality of optical packets passing consecutively have varied optical signal-to-noise ratios.

In the example of FIG. 2, an optical packet #1 whose destination is node 3 is sent from node 1, and an optical packet #2 whose destination is also node 3 is sent from node 2. The optical packet #1 and the optical packet #2 arrive at the measurement point of node 3 consecutively. As shown in FIG. 2, the optical packet #1 arrives at node 3 by way of node 2, whereas the optical packet #2 arrives at node 3 by way of node 5, node 6, and node 2. In cases like this, the optical packet #2, having passed through more nodes, has a lower optical signal-to-noise ratio than the optical packet #1.

Nevertheless, if a conventional measuring method as mentioned above is employed in measuring the optical signal-to-noise ratio, then what will be gained will be a totally meaningless result, such as a mere averaging of the optical signal-to-noise ratios of a plurality of optical packets. Thus, it will be difficult to measure the optical signal-to-noise ratio of each optical packet which must be measured.

Further, there is a problem concerning the measurement of the optical noise power in an optical packet switching system. FIGS. 3A to 3C are diagrams for explaining this problem. FIG. 3A shows an optical packet signal containing optical noise inputted to an optical packet switch. FIG. 3B shows a control signal given to the optical packet switch. FIG. 3C shows an optical packet signal outputted from the optical packet switch.

As shown in FIG. 3A, the optical noise power is constant on the input side of the optical packet switch. However, if the optical packet switch is turned on and off in conformity with the length of the optical packet signal by the control signal as shown in FIG. 3B, then the optical noise power will be attenuated by the extinction ratio of the optical packet switch on the output side thereof as shown in FIG. 3C and accordingly most of the optical noise power will be cut off. For example, an optical packet switch employing a semiconductor optical amplifier type gate device realizes an extinction ratio of about 50 dB, so that there is substantially no optical noise power before and after an optical packet signal outputted from the optical packet switch. As such, it is difficult to measure the optical noise power on the output side of the optical packet switch, thus making it impossible to measure the optical signal-to-noise ratio.

In FIGS. 3A to 3C, the illustration is such as to emphasize the interval between the timing of the optical packet switch turning from off to on and the first bit of the optical packet signal and the interval between the timing of the optical packet switch turning from on to off and the last bit of the optical packet signal. In actuality, however, these intervals, when they are not short enough, tend to lower the band usage efficiency, so that they are set to very short times of several nanosecond (ns).

SUMMARY OF THE INVENTION

The present invention has been made in view of the foregoing circumstances, and a purpose thereof is to provide a technology for measuring the optical signal-to-noise ratio of each optical packet signal in an optical packet switching system.

In order to resolve the above-described problems, an optical packet switching system according to one embodiment of the present invention includes: an optical packet generator configured to generate an optical packet signal; an optical packet switching unit, provided with an optical switch, configured to switch a route of an inputted optical packet signal by controlling on/off of the optical switch; and an optical signal-to-noise ratio measuring unit configured to measure an optical signal-to-noise ratio of the optical packet signal outputted from the optical packet switching unit. When switching the route of the optical packet signal, the optical packet switching unit may output an optical packet signal with optical noise by keeping the optical switch on for a time length that is longer than the time width of the packet signal. The optical signal-to-noise ratio measuring unit may measure a optical signal power and a optical noise power, respectively, in the optical packet signal with optical noise and may measure the optical signal-to-noise ratio by calculating the ratio between the optical signal power and the optical noise power.

The optical packet switching system may further include an optical switch unit configured to raise an extinction ratio of the optical packet signal, the optical switch unit being provided at a stage subsequent to the optical packet generator.

The optical signal-to-noise ratio measuring unit may identify the optical signal and the optical noise in the optical packet signal with optical noise, based on the arrival time of the optical packet signal and optical packet length information attached to the optical packet signal, and may measure the respective powers of the optical signal and the optical noise.

The optical packet signal may be a wavelength-multiplexed optical packet signal where optical packet signals of a plurality of wavelengths are wavelength-multiplexed, and the optical signal-to-noise ratio measuring unit may demultiplex the inputted wavelength-multiplexed packet signal into the optical packet signals of a plurality of wavelengths and then measure the optical signal-to-noise ratio of the optical packet signal of each of the plurality of wavelength.

When generating an optical packet signal, the optical packet generator may append information bit to said optical packet signal, the information bit indicating whether the optical signal-to-noise ratio is to be measured or not; when the information bit of the inputted optical packet signal indicates that the optical signal-to-noise ratio is to be measured, the optical packet switching unit may output the optical packet signal with optical noise; and when the information bit of the inputted optical packet signal indicates that the optical signal-to-noise ratio is to be measured, the optical signal-to-noise ratio may measure the optical signal-to-noise ratio.

The optical packet generator may periodically append information bit, which indicates whether the optical signal-to-noise ratio is to be measured, to the optical packet signal.

The optical packet generator may append information bit measurement instruction information, which indicates whether the optical signal-to-noise ratio is to be measured, to the optical packet signal according to an instruction given externally.

The optical signal-to-noise ratio measurement unit may have a storage that is configured to store the optical signal-to-noise ratio of the measured optical packet signal in a manner such that source information on said measured optical packet signal and the arrival time of said optical packet signal are associated with each other.

The optical signal-to-noise ratio measuring unit may measure the optical power of signal part at a plurality of measurement points over a time width of the optical packet signal, and measures the optical signal-to-noise ratio by using an average value of the measured optical powers as the optical power.

When generating an optical packet signal, the optical packet generator may insert a fixed pattern in a predetermined position of the optical packet signal, and the optical signal-to-noise ratio measuring unit may measure the optical power of the fixed pattern and calculate the optical signal-to-noise ratio by using the measured optical power as the optical signal power.

When generating an optical packet signal, the optical packet generator may insert a fixed pattern in an arbitrary position within the optical packet signal and append positional information on the fixed pattern to a header of the optical packet signal, and the optical signal-to-noise ratio measuring unit may measure the optical power of the fixed pattern based on the positional information on the fixed pattern and calculate the optical signal-to-noise ratio by using the measured optical power as the optical signal power.

The optical packet generator may vary the length of the fixed pattern and appends length information on the fixed pattern to a header of the optical packet signal, and the optical signal-to-noise ratio measuring unit may measure the optical power of the fixed pattern based on the length information on the fixed pattern and calculate the optical signal-to-noise ratio by using the measured optical power as the optical signal power.

The optical packet switching unit may control the optical switch in such a manner the optical noise is added before and/or after the optical packet, and the optical signal-to-noise ratio measuring unit may measure the power of the optical noise that is added before and/or after the optical packet, and calculate the optical signal-to-noise ratio by using the measured power as the optical noise power.

When generating an optical packet signal, the optical packet generator may insert a optical noise region, used to measure the optical noise power, in an arbitrary position within the optical packet signal and append positional information on the optical noise region to a header of the optical packet signal, and the optical signal-to-noise ratio measuring unit may measure the optical power of the optical noise region based on the positional information on the optical noise region and calculate the optical signal-to-noise ratio by using the measured optical power as the optical noise power.

The optical packet generator may vary the length of the optical noise region and append length information on the optical noise region to the header of the optical packet signal, and the optical signal-to-noise ratio measuring unit may measure the optical power of the optical noise region based on the length information on the optical noise region and calculate the optical signal-to-noise ratio by using the measured optical power as the optical noise power.

A plurality of the optical packet switching units may be provided at a stage subsequent to the optical packet generator; the plurality of the optical packet switching units may generate the optical packet signal with noise where the optical noise power varies in a staircase pattern, in a manner such that the time length of on-state of the optical switch is made longer gradually starting from the optical packet switching unit located upstream towards the optical packet switching unit located downstream; and the optical signal-to-noise ratio measuring unit may measure the optical noise power varied in the staircase pattern in the optical packet signal with noise, and calculate the optical signal-to-noise ratio for each output from each of the optical packet switching units by using the measured power.

The optical packet generator, the optical packet switching unit and the optical signal-to-noise ratio measuring unit may constitute a terminal apparatus; an optical packet switching network may be configured by connecting together a plurality of the terminal apparatuses; and an optical switch generator in one of the plurality of the terminal apparatuses may generate an optical packet signal for use in measurement of the optical signal-to-noise ratio, and the optical packet signal generated by the optical switch generator may be transmitted by unicast, multicast or broadcast to another terminal apparatus.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 4 is a diagram showing an optical packet switching system according to an embodiment of the present invention;

DETAILED DESCRIPTION OF THE INVENTION

Figure 1:
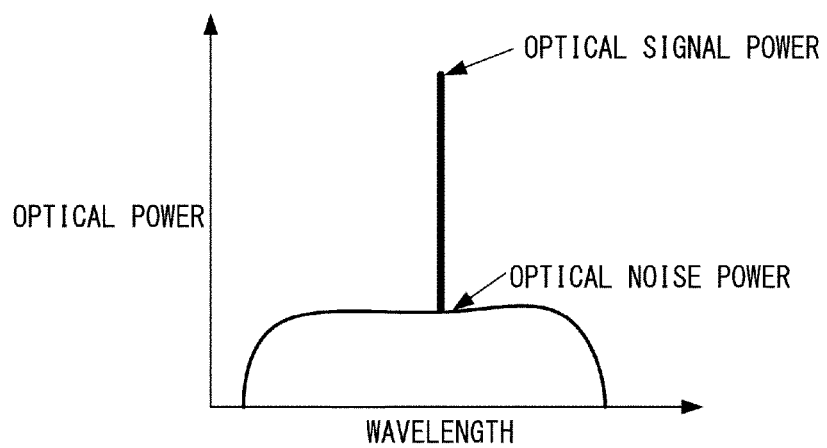
FIG. 1 is a diagram for explaining a method of measuring an optical signal-to-noise ratio as an example.
Figure 2:
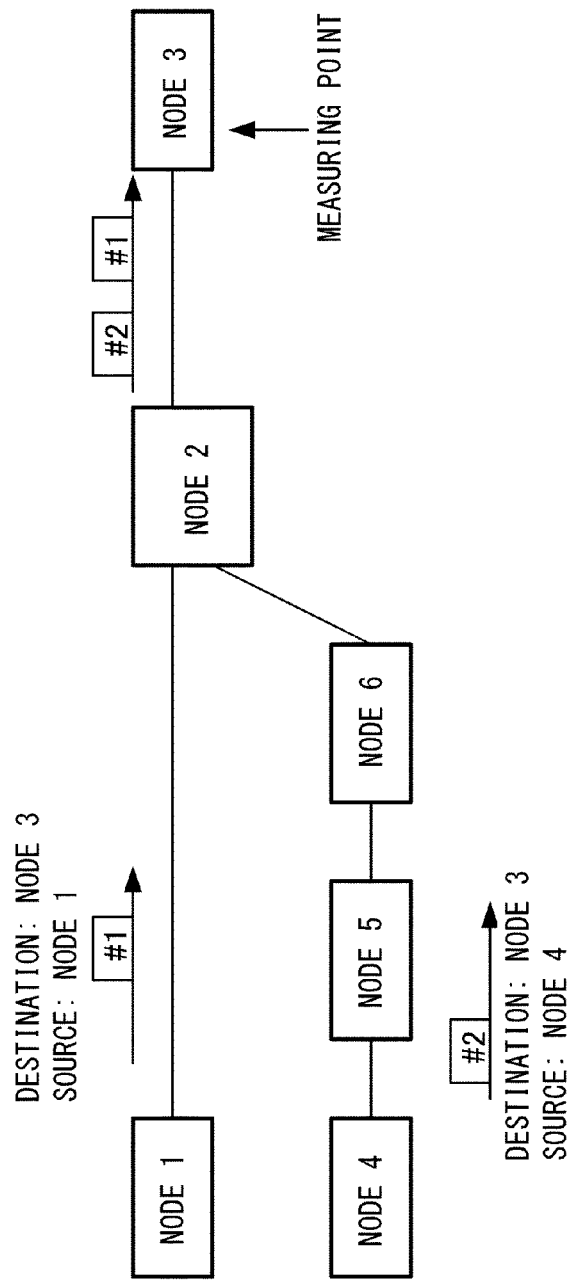
FIG. 2 is a diagram for explaining a problem with the measurement of the optical signal-to-noise ratio in an optical packet switching system.
Figure 3A:
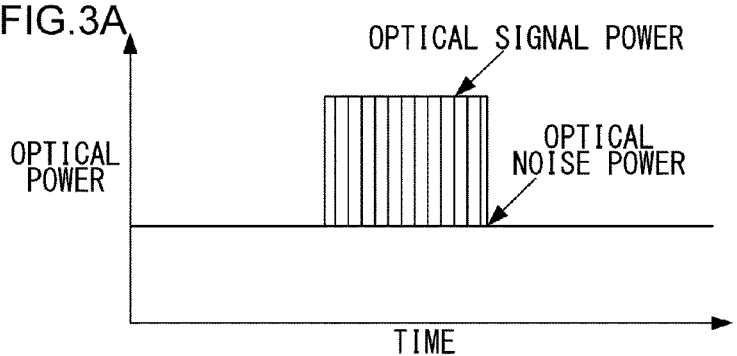
FIGS. 3A to 3C are diagrams for explaining a problem concerning the measurement of optical noise power in an optical packet switching system.
Figure 3B:
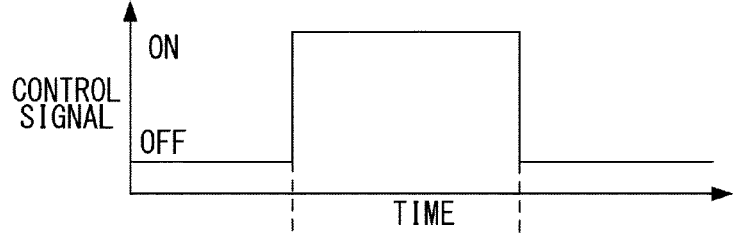
Figure 3C:
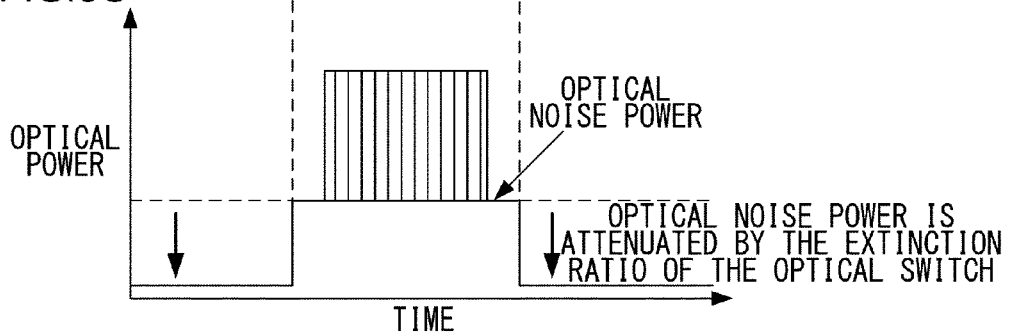

The invention will now be described by reference to the preferred embodiments. This does not intend to limit the scope of the present invention, but to exemplify the invention.

Hereinbelow, optical packet switching apparatuses according to preferred embodiment of the present invention are explained referring to drawings.

FIG. 4 shows an optical packet switching system 10 according to an embodiment of the present invention. The optical packet switching system 10 shown in FIG. 4 constitutes a terminal apparatus. An optical packet switching network is configured by connecting a plurality of such terminal apparatuses.

As shown in FIG. 4, the optical packet switching system 10 includes an optical packet generator 12, an optical switch unit 14, an optical amplifier 16, an optical packet switching unit 18, an optical branching unit 19, an optical packet receiver 20, and an optical signal-to-noise ratio measuring unit 22.

The optical packet generator 12 generates an optical packet signal in a manner such that a header containing the destination information and the packet length information are added to a client signal (e.g., 10 GEther packet signal) received from a client side.

The optical packet outputted from the optical packet generator 12 is inputted to the optical switch unit 14 provided at a stage subsequent to the optical packet generator 12. As will be discussed later, the optical switch unit 14 has a function of raising the extinction ratio of optical packet signal.

The optical packet signal outputted from the optical switch unit 14 is inputted to the optical amplifier 16 via an optical transmission path 24. The optical amplifier 16 amplifies the optical packet signal that has been attenuated along the optical transmission path 24. The optical signal outputted from the optical amplifier 16 is inputted to the optical packet switching unit 18 via an optical transmission path 26.

The optical packet switching unit 18 has a plurality of input ports and output ports. The optical packet signal from the optical amplifier 16 is inputted to one of the input ports. The other input ports of the optical packet switching unit 18, which are connected to an optical packet network, receives the input of optical packets from the other optical packet switching units, for example. The optical packet switching unit 18 extracts the destination information from the inputted optical signal, and switches the route of the optical packet signal. One of the output ports of the optical packet switching unit 18 is connected to the optical branching unit 19, whereas the other output ports thereof are connected to the optical packet network.

Figure 5:
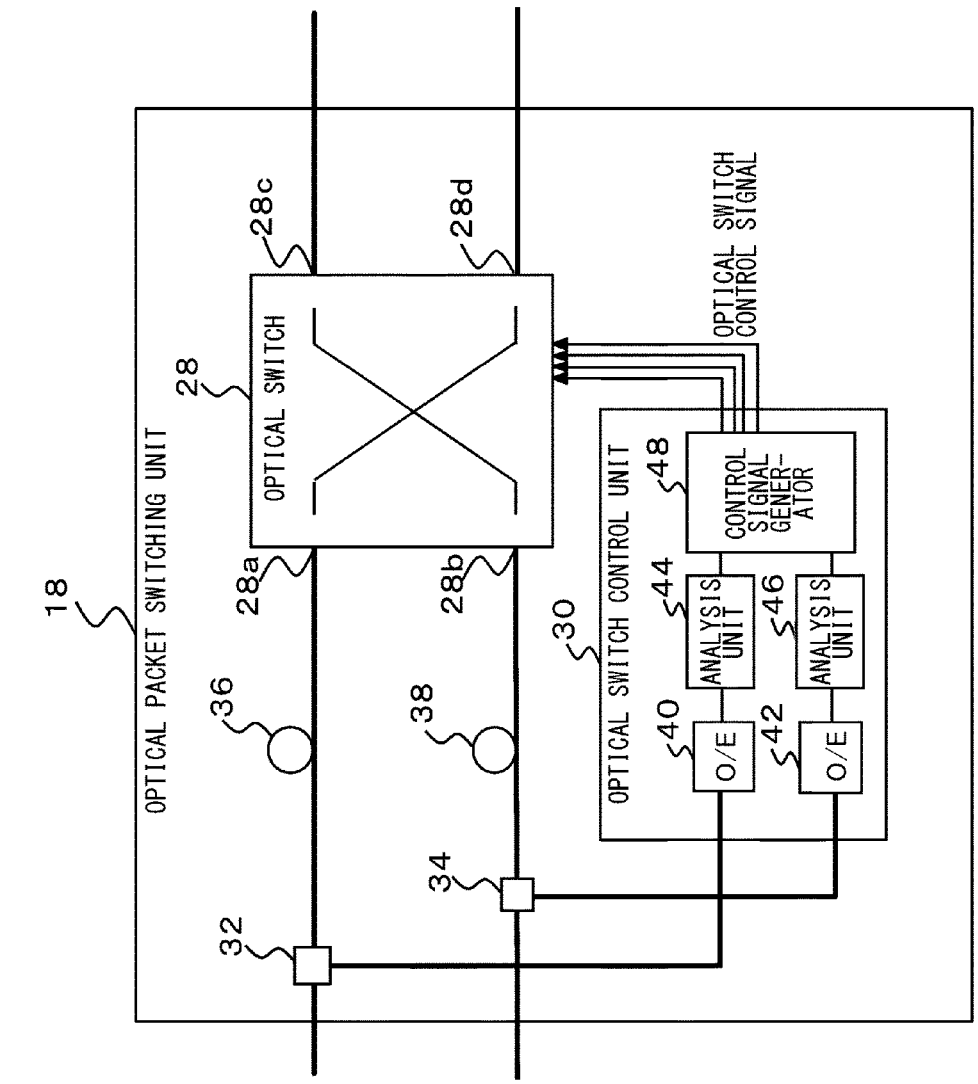
FIG. 5 is a diagram for explaining a structure of an optical packet switching unit.

FIG. 5 is a diagram for explaining a structure of the optical packet switching unit 18. For simplicity of explanation, a description is given herein of an optical packet switching unit 18 with two inputs and two outputs. The optical packet switching unit 18 includes an optical switch 28, an optical switch control unit 30, a first optical coupler 32, a second optical coupler 34, a first optical delay line 36, and a second optical delay line 38.

The first optical coupler, to which the optical transmission path 26 is connected, receives the input of the optical packet signal generated by the optical packet generator 12. The optical packet signal inputted to the first optical coupler 32 is branched off into two. One of the branched-off optical packet signals is inputted to a first input port 28a of the optical switch 28 via the first optical delay line 36. The other of the branched-off optical packet signals is inputted to the optical switch control unit 30.

The second optical coupler 34, to which the optical packet network is connected via an optical transmission path 27, receives the input of optical packets from the other optical packet switching units, for instance. The optical packet signal inputted to the second optical coupler 34 is branched off into two. One of the branched-off optical packet signals is inputted to a second input port 28b of the optical switch 28 via the second optical delay line 38. The other of the branched-off optical packet signals is inputted to the optical switch control unit 30.

The optical switch control unit 30 extracts the destination information from the inputted optical signal, and outputs a control signal to the optical switch 28 in response to the extracted destination information. As shown in FIG. 5, the optical switch control unit 30 includes a first optical-to-electrical (O/E) converter 40, a second optical-to-electrical (O/E) converter 42, a first analysis unit 44, and a second analysis unit 46, and a control signal generator 48.

The first optical-to-electrical converter 40 converts the optical packet signal received from the first optical coupler 32 into an electrical signal. Also, the second optical-to-electrical converter 42 converts the optical packet signal received from the second optical coupler 34 into an electrical signal.

The first analysis unit 44 analyzes the header of the packet signal received from the first optical-to-electrical converter 40 so as to extract the destination information therefrom. Also, the second analysis unit 46 analyzes the header of the packet signal received from the second optical-to-electrical converter 42 so as to extract the destination information therefrom.

The control signal generator 48 determines passage or discarding of an optical packet based on the result of header analysis at the first analysis unit 44 and the second analysis unit 46 and generates an optical switch control signal for controlling the on/off of the optical switch 28. Let us assume an instance where an optical packet is inputted to each of the first optical coupler 32 and the second optical coupler 34 and those two optical packets are to be directed to the first output port 28c. In such a case, the control signal generator 48 determines whether the two optical packets are in competition with each other or not. In other words, the control signal generator 48 determines whether the two optical packets are temporally overlapping each other or not. If the two optical packets are in competition with each other, the control signal generator 48 makes a decision to pass the earlier-arriving optical packet and discard the subsequent optical packet.

The first optical delay line 36 and the second optical delay line 38 delay the optical packet signals by the time that the optical switch control unit 30 takes to generate the optical switch control signal. With the first optical delay line 36 and the second optical delay line 38 provided, the on/off of the optical switch 28 can be controlled according to the timing of the optical packet signals arriving at the optical switch 28.

The optical switch 28, whose on/off is controlled by the optical switch control signals from the optical switch control unit 30, outputs the inputted optical packet signals by switching their paths. The optical switch 28 may be one employing a semiconductor optical amplifier (SOA), for instance. In the present embodiment, the optical switch 28, which is a 2×2 optical switch (two inputs and two outputs), is provided with four SOA gates (not shown). When a certain optical packet signal is passed through, the optical switch 28 is kept on while the optical packet is passing and turned off upon completion of the passage.

Referring back to FIG. 4, a description of the optical packet switching system 10 will be continued. The optical branching unit 19 provided at a state subsequent to the optical packet switching unit 18 bifurcates an optical packet signal inputted from the optical packet switching unit 18. One of the optical packet signals bifurcated by the optical branching unit 19 is inputted to the optical packet receiver 20 as a main signal, while the other thereof is inputted to the optical signal-to-noise ratio measuring unit 22.

The optical packet receiver 20 generates a client signal by performing predetermined receiving processing, such as removal of the header, on the inputted optical packet signal. The client signal thus generated by the optical packet receiver 20 is outputted to the client side.

The optical signal-to-noise ratio measuring unit 22 measures the optical signal-to-noise ratio of the inputted optical packet signal. A detailed structure of the optical signal-to-noise ratio measuring unit 22 will be described later.

FIGS. 6A to 6D show examples of optical power waveforms at the measurement points A to D shown in FIG. 4. In the optical packet switching system 10 as shown in FIG. 4, the point where the optical signal-to-noise ratio is actually measured is only the measurement point D after the optical packet switching unit 18. However, for the purposes of explanation, the optical power waveforms at the measurement points A to C are shown here also.

Figure 6A:
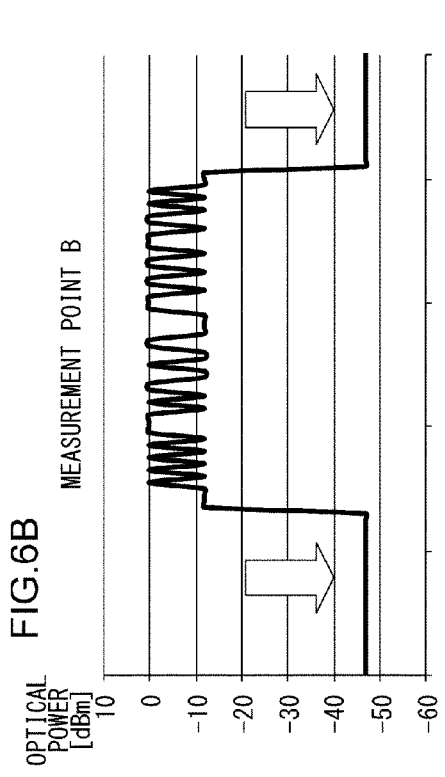
FIGS. 6A to 6D show examples of optical power waveforms at the measurement points A to D shown in FIG. 4.

FIG. 6A shows a optical power waveform at the measurement point A after the optical packet generator 12. Shown in FIG. 6A is a single optical packet signal generated by the optical packet generator 12. It is assumed here that the optical packet generator 12 outputs an optical packet signal whose peak power is 0 dBm, using an electronic absorption (EA) modulator of 12 dB extinction ratio. If an low-noise (LN) modulator is used, an extinction ratio of about 20 dB will be realized.

Figure 6B:
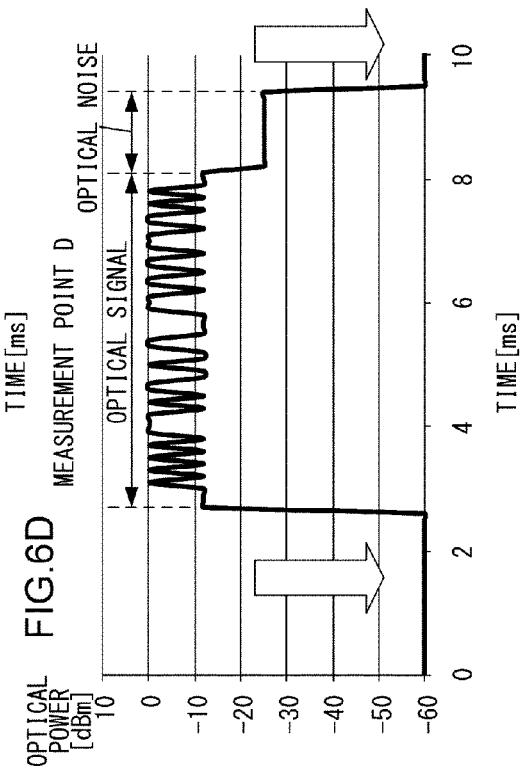

FIG. 6B shows a optical power waveform at the measurement point B after the optical switch unit 14. It is assumed here that the optical switch unit 14 is an ideal optical switch that has an extinction ratio of 35 dB and no optical attenuation when the switch is on. The optical switch unit 14 turns on only during the time when an optical packet signal exists and turns off otherwise. Thus, as shown in FIG. 6B, an optical packet signal with high extinction ratio can be obtained. The optical switch unit 14 is required for the following reason. If the extinction ratio at the measurement point B is small, the zero level at the modulator of the optical packet generator 12 may appear to be larger than the optical noise generated by the subsequent optical amplifier 16, thus making it impossible to measure the optical signal-to-noise ratio. Note that there will be no need for the optical switch unit 14 if a modulator whose extinction ratio is very high is used at the optical packet generator 12.

Figure 6C:
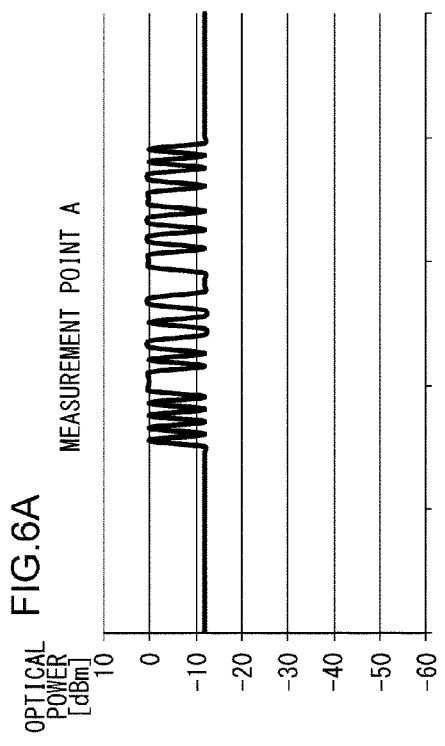

FIG. 6C shows a optical power waveform at the measurement point C after the optical amplifier 16. As an optical packet signal as shown in FIG. 6B passes through the optical transmission path 24, there occurs an attenuation of optical power. The optical amplifier 16 amplifies the optical packet signal so that the peak power of the optical packet signal becomes 0 dBm. It is assumed here that the amplified spontaneous emission (ASE) of the optical amplifier 16 is −25 dBm. As an optical packet signal passes through the optical amplifier 16, a optical noise is added thereto by the ASE produced by the optical amplifier 16. As a result, as shown in FIG. 6C, the optical power before and after the optical packet signal is inflated, thereby showing the presence of optical noise. It is to be noted, however, that the peak power of the optical packet signal shows little change.

Figure 6D:
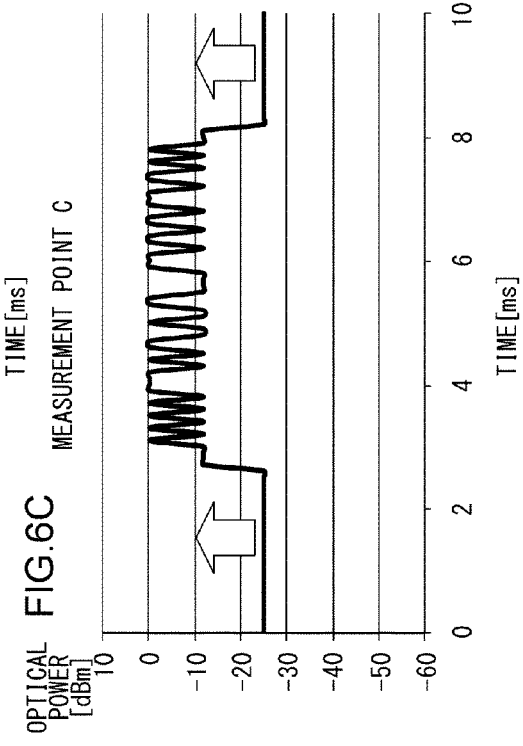

FIG. 6D shows a optical power waveform at the measurement point D after the optical packet switching unit 18. The optical signal-to-noise ratio at this measurement point D is measured by the optical signal-to-noise ratio measuring unit 22.

In the present embodiment, the optical packet switching unit 18 keeps the optical switch on longer than the time width of the packet signal in switching the route of the optical packet signal. In other words, the on-state of the optical switch is kept longer than the time during which the optical packet signal is present. In the example of FIG. 6D, the optical packet switching unit 18 keeps the optical switch on even after the last bit of the optical packet signal has passed through the optical packet switching unit 18. As a result, optical noise added by the optical amplifier 16 remains behind the optical signal as shown in FIG. 6D. Hereinafter, an optical packet signal with a optical noise remaining (or attached) as shown in FIG. 6D will be referred to as an "optical packet signal (added) with optical noise".

In the optical packet switching system 10 as shown in FIG. 4, an optical packet signal with optical noise as shown in FIG. 6D is inputted to the optical signal-to-noise ratio measuring unit 22 provided at a stage subsequent to the optical packet switching unit 18. The optical signal-to-noise ratio measuring unit 22 measures the optical power of the signal part and the optical power of the noise part of the optical packet signal with optical noise and determines the optical signal-to-noise ratio by calculating the ratio between them.

Thus, according to the optical packet switching system 10 in this embodiment, an optical packet signal with optical noise is generated by the optical packet switching unit 18 with the result that the optical signal power and the optical noise power can be measured by the subsequent optical signal-to-noise ratio measuring unit 22 and therefore the optical signal-to-noise ratio of the optical packet signal can be calculated.

It should be noted that it is not necessary to provide the optical switch unit 14 to specifically raise the extinction ratio. The optical switch unit 14 may be provided as a first stage of the optical packet switching unit also. This can be accomplished by changing the control timing of the optical switch of the first stage and the second stage and thereafter. More exactly, in carrying out the optical packet switching, the first stage of the optical packet switching unit may perform control such that the optical switch is kept on for the same duration as the time width of the optical packet signal, whereas the second stage and thereafter of the optical packet switching unit may perform control such that the optical switch is kept on longer than the time width of the optical packet signal.

Figure 7:
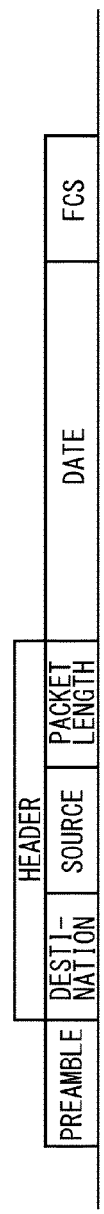
FIG. 7 shows an example of a format of an optical packet signal.

FIG. 7 shows an example of a format of an optical packet signal. As shown in FIG. 7, each packet signal includes a data area, which is a user domain, a header preceding the data, a preamble preceding the header, and a frame check sequence (FCS), for use in detecting error, which is placed after the data. The preamble ensures stable operation of an optical receiver in receiving the optical packet signals. The header includes destination information, source information, and packet length information. Thus, an optical packet signal comes with the packet length information attached, so that the time width where the optical packet signal is present can be determined from the packet length information and the time of arrival of the optical packet signal.

Figure 8:
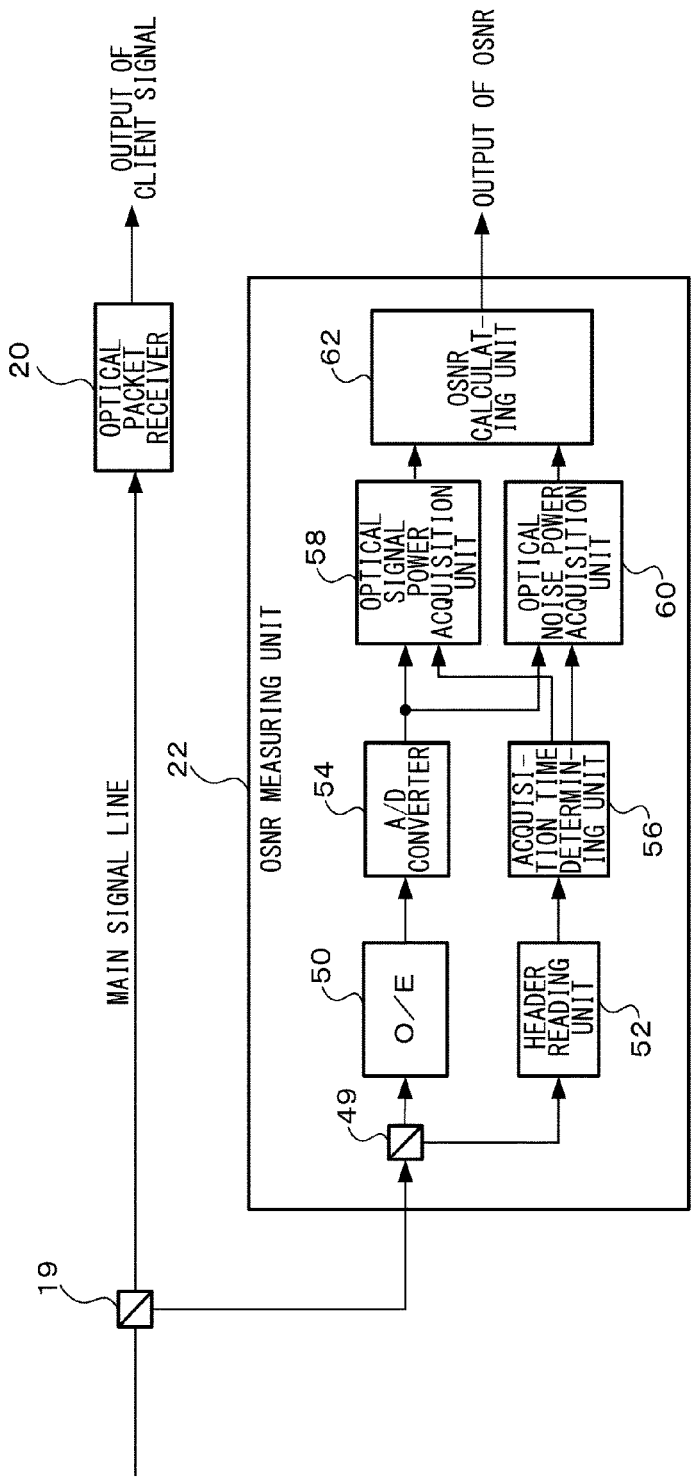
FIG. 8 is a diagram for explaining an exemplary structure of an optical signal-to-noise ratio measuring unit.

FIG. 8 is a diagram for explaining an exemplary structure of the optical signal-to-noise ratio measuring unit 22. As shown in FIG. 8, the optical signal-to-noise ratio measuring unit 22 includes an optical branching unit 49, an optical-to-electrical converter 50, a header reading unit 52, an A/D converter 54, a retrieval time determining unit 56, a optical signal power acquisition unit 58, a optical noise power acquisition unit 60, and an optical signal-to-noise ratio calculating unit 62.

The optical packet signal with optical noise, which has been inputted to the optical signal-to-noise ratio measuring unit 22, is first bifurcated by the optical branching unit 49. One of the branched-off optical packet signals is inputted to the optical-to-electrical converter 50, and the other thereof is inputted to the header reading unit 52.

The optical-to-electrical converter 50 converts the inputted optical packet signal into an electrical packet signal and outputs the electrical packet signal to the A/D converter 54. The A/D converter 54 converts the inputted packet signal into a digital signal (analog-to-digital conversion) and outputs the thus obtained digital signal to the optical signal power acquisition unit 58 and the optical noise power acquisition unit 60.

At the same time, the header reading unit 52 converts the inputted optical packet signal into an electrical signal and then reads out the packet length information contained in the header. The retrieval time determining unit 56 identifies a signal part and a noise part, namely distinguishes the signal part and the part from each other, in the optical packet signal with optical noise, based on the arrival time of the optical packet signal and the packet length information acquired by the header reading unit 52.

The optical signal power acquisition unit 58 takes in the digital signal inputted from the A/D converter 54, based on the retrieval timing of optical signal determined by the retrieval time determining unit 56. Also, the optical noise power acquisition unit 60 takes in the digital signal inputted from the A/D converter 54, based on the retrieval timing of optical noise determined by the retrieval time determining unit 56.

The optical signal-to-noise ratio calculating unit 62 calculates the ratio between the optical signal power acquired by the optical signal power acquisition unit 58 and the optical noise power acquired by the optical noise power acquisition unit 60.

Figure 9:
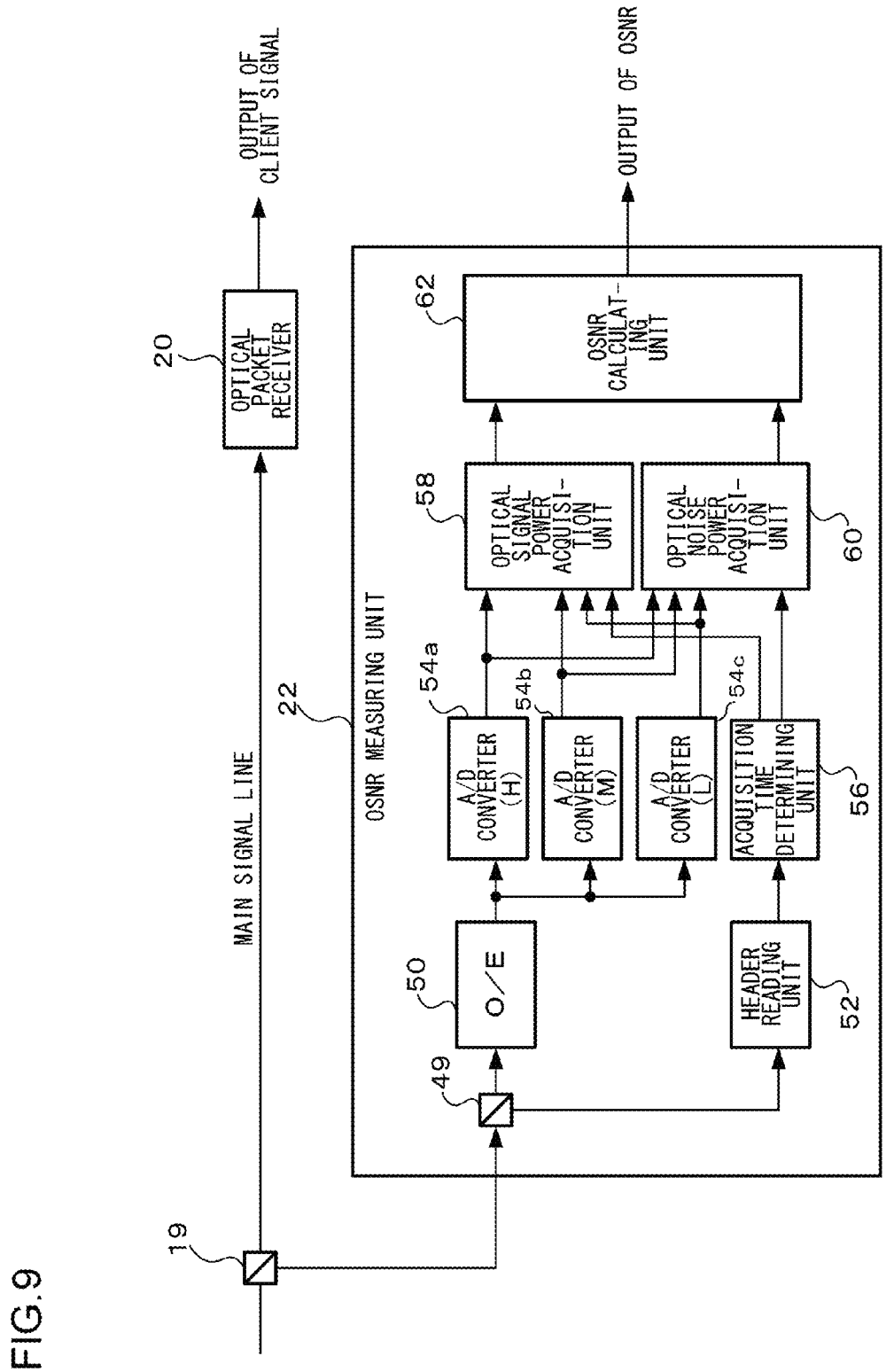
FIG. 9 is a diagram for explaining another exemplary structure of an optical signal-to-noise ratio measuring unit.

FIG. 9 is a diagram for explaining another exemplary structure of the optical signal-to-noise ratio measuring unit 22. Components of the optical signal-to-noise ratio measuring unit 22 shown in FIG. 9, which are identical to or correspond to those of the optical signal-to-noise ratio measuring unit shown in FIG. 8, are given the same reference numerals herein and the repeated description thereof are omitted as appropriate.

Since it is often the case that there is a power difference of 20 dB or above in between the optical signal and the optical noise, it is desirable that a wide input dynamic range be achieved. In order to enlarge the input dynamic range, three A/D converters, which are a first A/D converter 54a for use with high level signals, a second A/D converter 54b for use with middle level signals, and a third A/D converter 54c for use with low level signals, are prepared in this exemplary structure as A/D converters that perform analog-to-digital conversion on the optical-to-electrical converter 50. And the respective three A/D converters 54a, 54b, and 54c perform analog-to-digital conversion independently.

Figure 10:
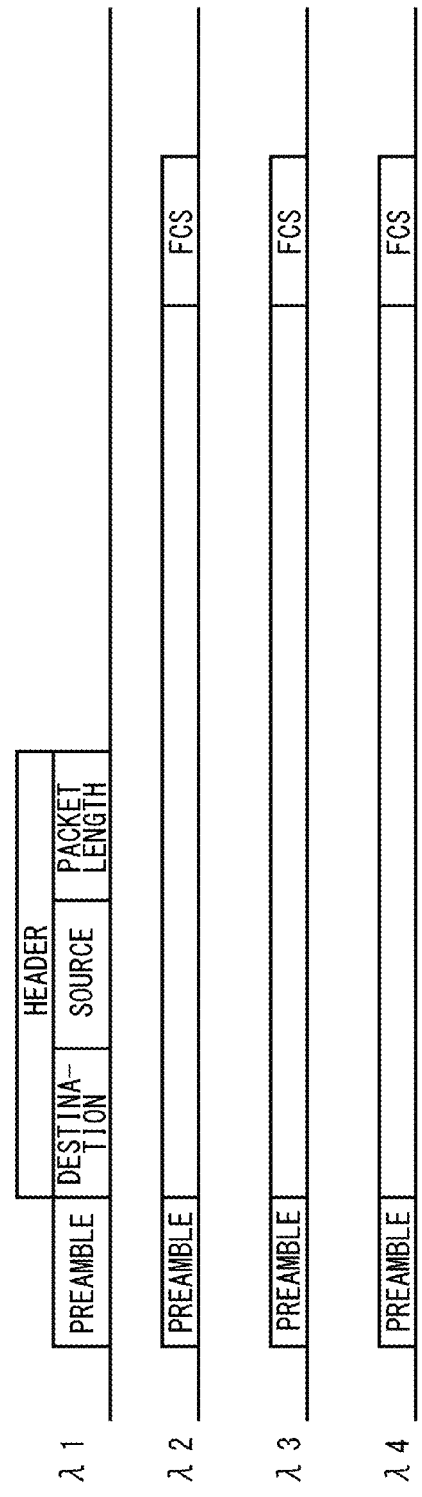
FIG. 10 shows another example of a format of an optical packet signal.

FIG. 10 shows another example of a format of an optical packet signal. In an optical packet switching scheme, there are cases where wavelength-multiplexed optical packet signals, in which optical packet signals of multiple wavelengths have been wavelength-multiplexed, are subjected to the optical packet switching. In the example of the format of the wavelength-multiplexed optical packet signals shown in FIG. 10, a header is assigned to an optical packet signal of wavelength $\lambda 1$, whereas data are assigned to optical packet signals of wavelength $\lambda 2$ to $\lambda 4$, respectively. A preamble is appended to the beginning of each of the respective optical packet signals.

Figure 11:
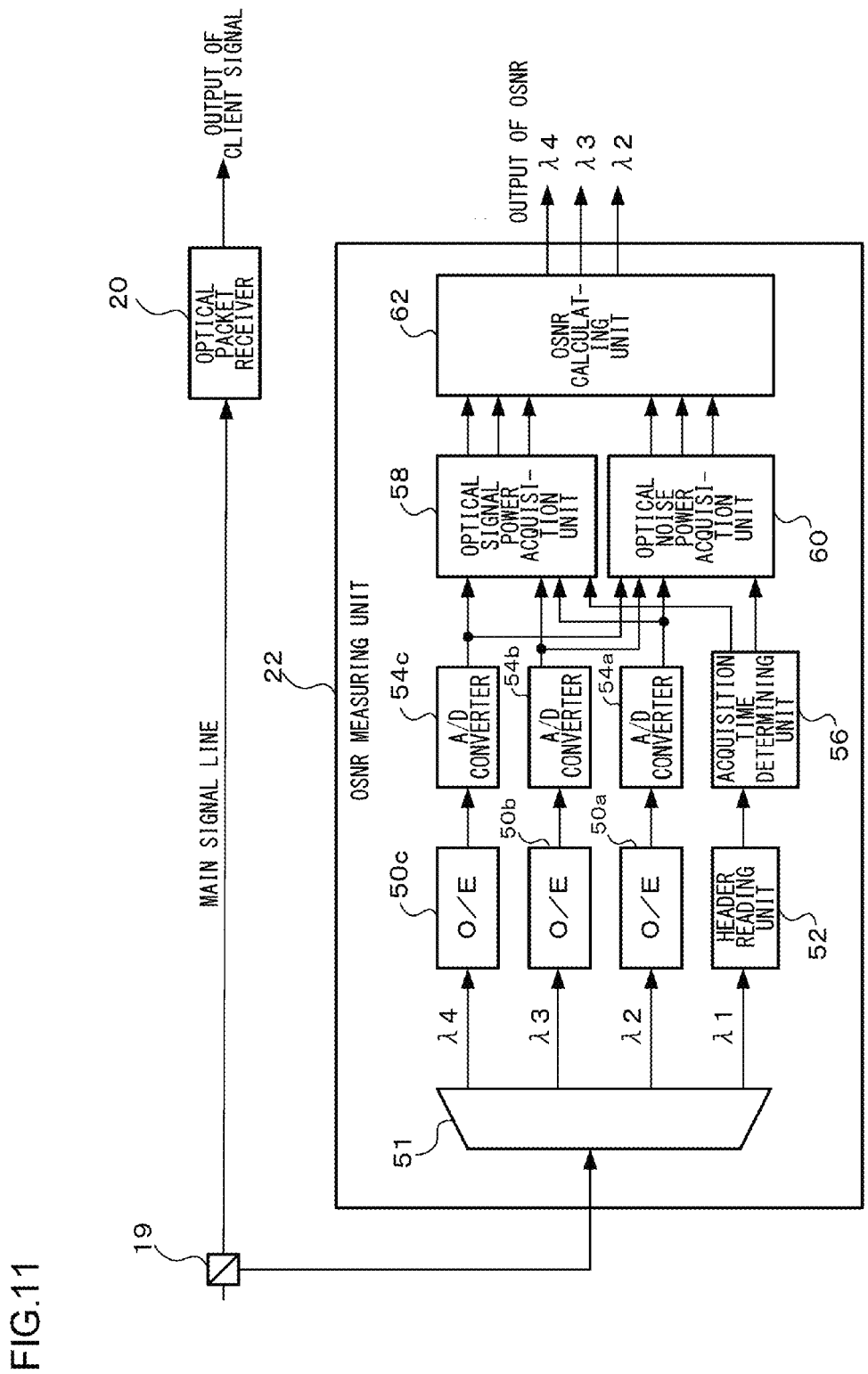
FIG. 11 is a diagram for explaining still another exemplary structure of an optical signal-to-noise ratio measuring unit.

FIG. 11 is a diagram for explaining still another exemplary structure of the optical signal-to-noise ratio measuring unit 22. An optical signal-to-noise ratio measuring unit 22 shown in FIG. 11 is of a configuration suitable for measuring the optical signal-to-noise ratio of the wavelength-multiplexed optical packet signals. By employing this optical signal-to-noise ratio measuring unit 22, the optical signal-to-noise ratio can be measured for each wavelength.

The optical signal-to-noise ratio measuring unit 22 shown in FIG. 11 includes a wavelength demultiplexing unit 51, first to third optical-to-electrical (O/E) converters 50a to 50c, a header reading unit 52, first to third A/D converters 54a to 54c, a retrieval time determining unit 56, a optical signal power acquisition unit 58, a optical noise power acquisition unit 60, and an optical signal-to-noise ratio calculating unit 62.

The wavelength demultiplexing unit 51 demultiplexes an inputted wavelength-multiplexed optical packet signal into optical packet signals of wavelengths $\lambda 1$ to $\lambda 4$. The optical packet signal of wavelength $\lambda 1$ is inputted to the header reading unit 52. At the same time, the optical packet signals of wavelengths $\lambda 2$ to $\lambda 4$ are inputted to the first to third A/D converters 54a, 54b and 54c, respectively.

The first to third optical-to-electrical (O/E) converters 50a, 50b and 50c convert the inputted optical packet signals of wavelengths $\lambda 2$ to $\lambda 4$ into electric packet signals, respectively, and outputs the electrical packet signals to the first to third A/D converters 54a, 54b and 54c. The first to third A/D converters 54a, 54b and 55c convert the inputted packet signals into digital signals, respectively, and outputs the thus obtained digital signals to the optical signal power acquisition unit 58 and the optical noise power acquisition unit 60.

At the same time, the header reading unit 52 converts the inputted optical packet signal of wavelength $\lambda 1$ into an electrical signal and then reads out the packet length information contained in the header. The retrieval time determining unit 56 identifies a signal part and a noise part, namely distinguishes the signal part and the part from each other, in the optical packet signal with optical noise, based on the arrival time of the wavelength-multiplexed optical packet signal and the packet length information acquired by the header reading unit 52. If the formats of wavelengths $\lambda 2$ to $\lambda 4$ are identical to each other, the retrieval timing of the optical signal power and the optical noise power may be identical to each other regardless of the wavelength.

The optical signal power acquisition unit 58 takes in the digital signals inputted from the first to third A/D converters 54a to 54c, based on the retrieval timing of optical signal determined by the retrieval time determining unit 56. Also, the optical noise power acquisition unit 60 takes in the digital signals inputted from the first to third A/D converters 54a to 54c, based on the retrieval timing of optical noise determined by the retrieval time determining unit 56.

The optical signal-to-noise ratio calculating unit 62 calculates the ratio between the optical signal power acquired by the optical signal power acquisition unit 58 and the optical noise power acquired by the optical noise power acquisition unit 60, for each of the wavelengths $\lambda 2$ to $\lambda 4$. As described above, the optical signal-to-noise ratio calculating unit 62 according to the present embodiment can measure the optical signal-to-noise ratio for each of the wavelengths $\lambda 2$ to $\lambda 4$.

In the above-described embodiment, the optical packet signal of wavelength $\lambda 1$ to which the header is assigned is a signal that is excluded from the signals to be monitored. However, this optical packet signal of wavelength $\lambda 1$ to which the header is assigned may be included in those to be monitored if an optical-to-electrical converter for the wavelength $\lambda 1$ is provided separately.

Figure 12:
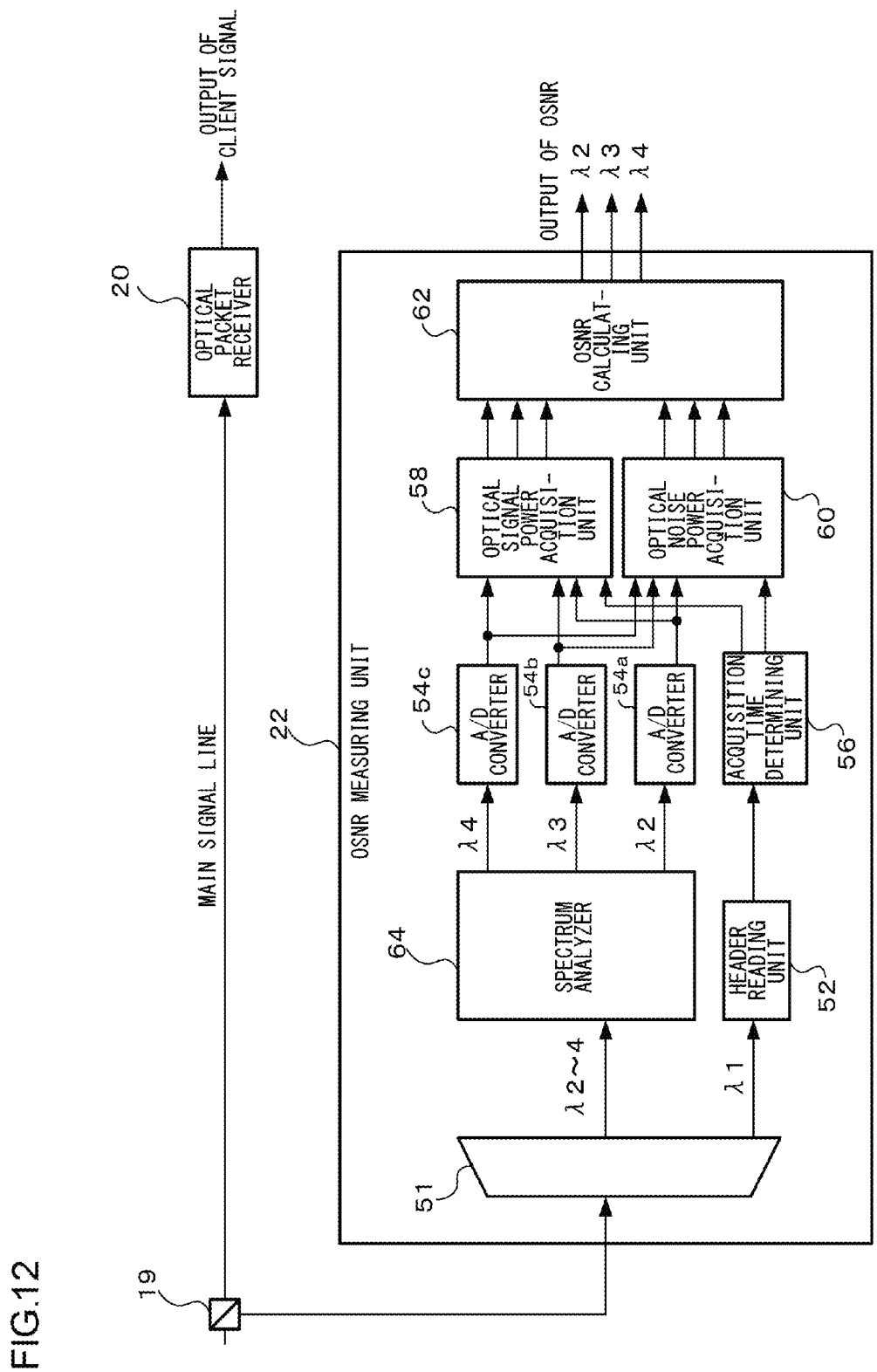
FIG. 12 is a diagram for explaining still another exemplary structure of an optical signal-to-noise ratio measuring unit.

FIG. 12 is a diagram for explaining still another exemplary structure of the optical signal-to-noise ratio measuring unit 22. An optical signal-to-noise ratio measuring unit 22 shown in FIG. 12 is also of a configuration suitable for measuring the optical signal-to-noise ratio of the wavelength-multiplexed optical packet signals. Components of the optical signal-to-noise ratio measuring unit 22 shown in FIG. 12, which are identical to or correspond to those of the optical signal-to-noise ratio measuring unit shown in FIG. 11, are given the same reference numerals herein and the repeated description thereof are omitted as appropriate.

The optical signal-to-noise ratio measuring unit 22 according to the present embodiment differs from the optical signal-to-noise ratio measuring unit shown in FIG. 11 in that a spectrum analyzer 64 is provided in substitution for the first to third optical-to-electrical converters. There are several principles for the spectrum analyzer. FIG. 12 shows an exemplary structure of the optical signal-to-noise ratio measuring unit 22 where the spectrum analyzer is configured by a diffraction grating and parallel photodiode (PD) arrays, for instance.

In this exemplary structure, the optical packet signal of wavelength $\lambda 1$, to which the header is assigned, and the optical packet signals of wavelengths $\lambda 2$ to $\lambda 4$ are first demultiplexed by the wavelength demultiplexing unit 51. Then, the optical packet signals of wavelengths $\lambda 2$ to $\lambda 4$ are inputted to a spectrum analyzer 64 where a diffraction grating and parallel PD arrays are combined. The spectrum analyzer 64 outputs the optical packet signals of wavelengths λ2 to λ4 to the first to third A/D converters 54a to 54c, respectively. The processings performed after the processing at the first to third A/D converters 54a to 54c are similar to those in the optical signal-to-noise ratio measuring unit shown in FIG. 11.

Since an optical spectrum analyzer is normally designed to measure steady optical signal and noise, the operation speed of most of the optical spectrum analyzers normally used is slow. Nevertheless, the measurement in units of optical packet is required in this optical signal-to-noise ratio measuring and therefore an optical spectrum analyzer capable of ultrafast operation needs to be employed.

In the optical packet switching system according to the present embodiment, the optical switch is kept on in the optical packet switching unit even during the time when the optical packet is absent, and the power of the remaining optical noise is measured. This means that a time slot otherwise occupied by an optical packet is wasted because of the optical noise. As a result, the packet discarding may occur due to a reduction in the bandwidth usage efficiency and a shortage of free timing.

Thus, control may be performed such that the measurement is conducted only when needed, instead of constantly measuring the optical signal-to-noise ratio in a continuous manner. More to the point, when optical packet signals are generated by the optical packet generator, information bit indicating whether or not the optical signal-to-noise ratio is to be measured is appended to the header. And if the information bit appended to the header of an inputted packet signal indicates that the optical signal-to-noise ratio is to be measured, the optical packet switching unit will generate the optical packet signal with optical noise. If, on the other hand, the information bit indicates that the optical signal-to-noise ratio is not to be measured, control will be performed such that the optical switch is kept on only during the time width of the optical packet signal, that is, control will be performed the same way as the optical packet switching is normally controlled.

The optical signal-to-noise ratio measuring unit 22 takes in the optical signal power and the optical noise power only when the information bit appended to the inputted optical packet signal indicates that the optical signal-to-noise ratio is to be measured, and then calculates the optical signal-to-noise ratio. By performing such control as described above, the degradation of the bandwidth usage efficiency can be suppressed and the rise in the packet discarding rate can be suppressed.

As described above, the optical signal-to-noise ratio is measured when needed. A description is now given hereunder of methods for setting the measurement timing.

A first method for setting the measurement timing is as follows. A timer is provided inside the optical packet generator. And the information bit indicating that the optical signal-to-noise ratio is to be measured is autonomously attached to the header at a constant frequency and transmitted. In this first method, the measurement is taken automatically and therefore the information concerning the optical signal-to-noise ratio is constantly updated. Thus, if the measurement of the optical signal-to-noise ratio results in a value lower than a certain characteristic degradation threshold value, a warning that reports the characteristic degradation of the applicable optical packet signal may be issued.

A second method for setting the measurement timing is as follows. When a maintenance person of the system wishes to conduct the measurement, an instruction is issued accordingly. Upon receipt of the instruction, the optical packet generator transmits the information bit indicating the measurement of the optical signal-to-noise ratio. For example, when the optical signal-to-noise ratio of a route that reaches station C after passing through station A and then station B, the maintenance person of the system gives an instruction to the optical packet generator at the station A and has the station A attach the information bit indicating the measurement of the optical signal-to-noise ratio to an optical packet signal destined for the station C. Thereby, the optical signal-to-noise ratios are measured at the station B and the station C, so that the maintenance person can obtain the measurement results of the optical signal-to-noise ratio by remotely accessing the station B and the station C.

Next, let us think about how to store the measurement results of the optical signal-to-noise ratio. The optical packet switching system according to the preset embodiment measures the optical signal-to-noise ratio for each optical packet. Thus the measurement results of the optical signal-to-noise ratios of several hundred thousands of packets are obtained in a few minutes. Further, the measurement results thereof include those of the packets arriving from various kinds of sources. The information concerning from which station the packets have been transmitted and so forth is of importance.

In the light of this, the optical signal-to-noise ratio measuring unit may have a storage for storing the measurement results of the optical signal-to-noise ratios. It is desirable that the measurement results of the optical signal-to-noise ratios are stored in a manner such that the measurement results thereof are associated with the source information on each optical packet signal and the arrival time of each optical packet signal. Here, the source information may include a device address of the optical packet generator that is the source (sender), and the like. Thus, if an optical packet signal whose optical signal-to-noise ratio is degraded is found, determining which route of the optical packet network has a problem and analyzing the problem can be facilitated. Also, since a great many optical packet signals arrive, their time averaged value and their variation over time may be calculated and then stored.

Figure 13:
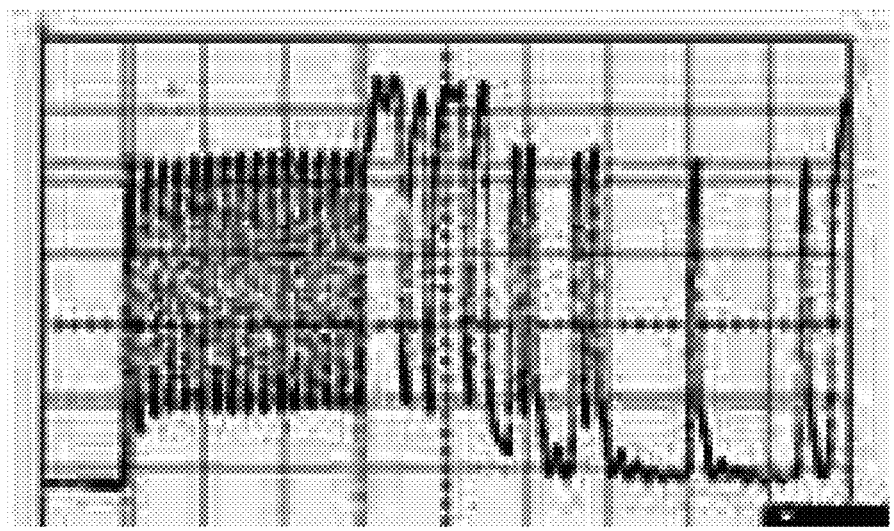
FIG. 13 is an example of waveform where an optical packet signal is measured by a high-speed oscilloscope.

A description is now given of a method for measuring the optical signal power. FIG. 13 is an example of waveform where an optical packet signal is measured by a high-speed oscilloscope.

The data of optical packet signal takes an arbitrary pattern composed of "1's" and "0's" depending on a client signal. As evident from FIG. 13, the following phenomena occur. That is, the optical power is relatively high in a part where "1" continues, whereas the optical power is relatively low in a part where "0" continues. Also, bits are crushed in a part where a small transition of 1 and 0 continues and, as a result, the optical power becomes an intermediate value. Thus, a correct measurement value may not be obtained by merely sampling the packet signal at random when an arbitrary bit sequence of optical packet singles have arrived.

Figure 14:
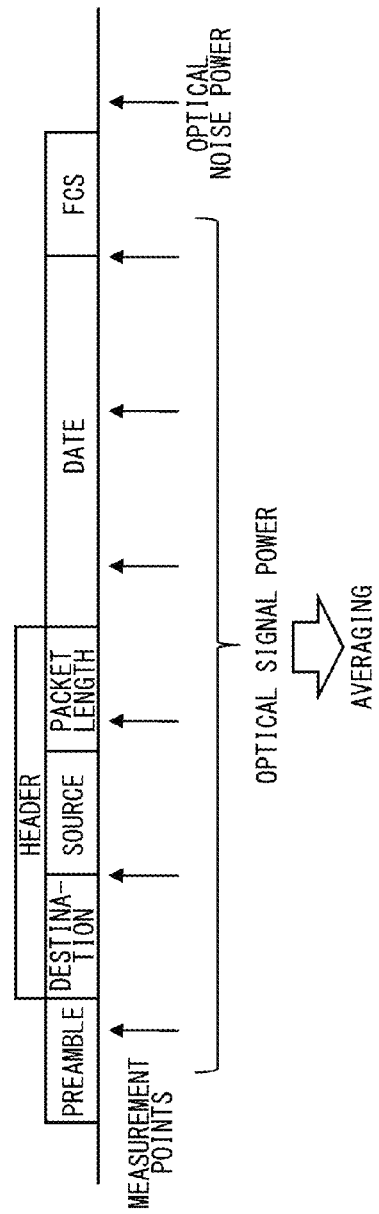
FIG. 14 is a diagram for explaining a method for measuring the optical signal power.

FIG. 14 is a diagram for explaining a method for measuring the optical signal power. In this method, the optical power is measured at a plurality of measurement points over a time width of each optical packet signal, and an average value of these optical powers is regarded as the optical signal power. If the scrambling processing is performed such that the number of bits of "1's" and "0's" are almost balanced therebetween in the optical packet signals, the duty ratio should appear to be about 50% due to the averaging process. Thus this method proves effective.

If the optical packet signal is of a modulation format, such as return-to-zero (RZ) mode, where the average power does not become 50%, instead of non-return-to-zero (NRZ), there may be a difference between the actual peak power and the measurement result. In such a case, a difference between the value of the optical signal power measured by a higher-precision measurement instrument and the value of the optical signal power measured by the measurement instrument used in the present embodiment is stored in advance and said difference may be subtracted from the measurement result from that of the measurement instrument used in the present embodiment.

Figure 15:
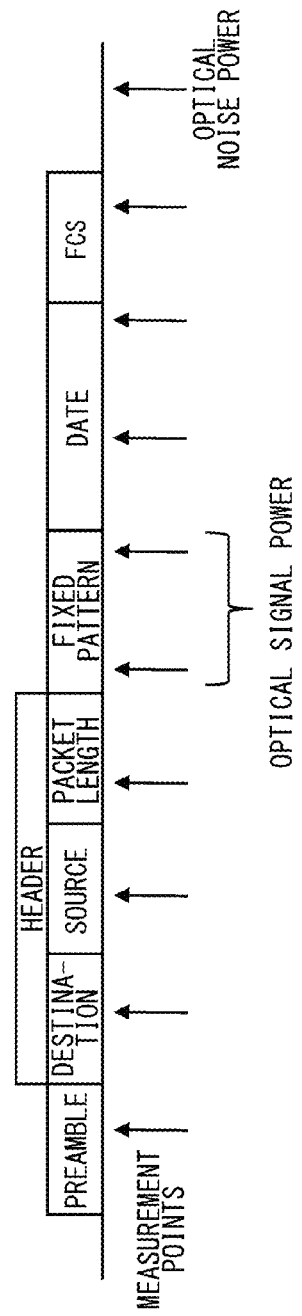
FIG. 15 is a diagram for explaining another method for measuring the optical signal power.

FIG. 15 is a diagram for explaining another method for measuring the optical signal power. In this method, a predetermined "fixed pattern" is inserted in a predetermined position of an optical packet signal when the optical packet signal is generated by the optical packet generator. This fixed pattern is a pattern composed of 10101010, for example, and the like. The position where the fixed pattern is inserted may be a position fixed relative to the header, which is a position immediately after the header, as shown in FIG. 15, for instance.

Though the optical signal power acquisition unit measures the optical power at a plurality of measurement points over the time width of each packet signal, only the optical power measured for the fixed pattern is outputted to the optical signal-to-noise ratio calculating unit as the optical signal power. Alternatively, the optical power for the fixed pattern only may be measured in the first place. In the example of FIG. 15, the fixed pattern is measured at two measurement points. However, it goes without saying that the fixed pattern may be measured at a signal measurement point. Where the optical power of the fixed pattern is measured at two or more measurement points, it is only necessary to calculate an average value of them as the optical signal power. The required length of fixed pattern depends on the sampling speed of the optical signal-to-noise ratio measuring unit; if the sampling speed thereof is faster, the required length of fixed pattern may be shorter. If a synchronous code or the like used to establish the synchronization is present in an optical packet signal, its pattern may be used as the measurement point.

As explained in conjunction with FIG. 13, the optical power of optical signal varies depending on the pattern composed of 1's and 0's. Thus, the optical power measured for the fixed pattern is regarded as the optical signal power, as described above, so that a stable measurement result independent of the data pattern can be obtained.

Figure 16:
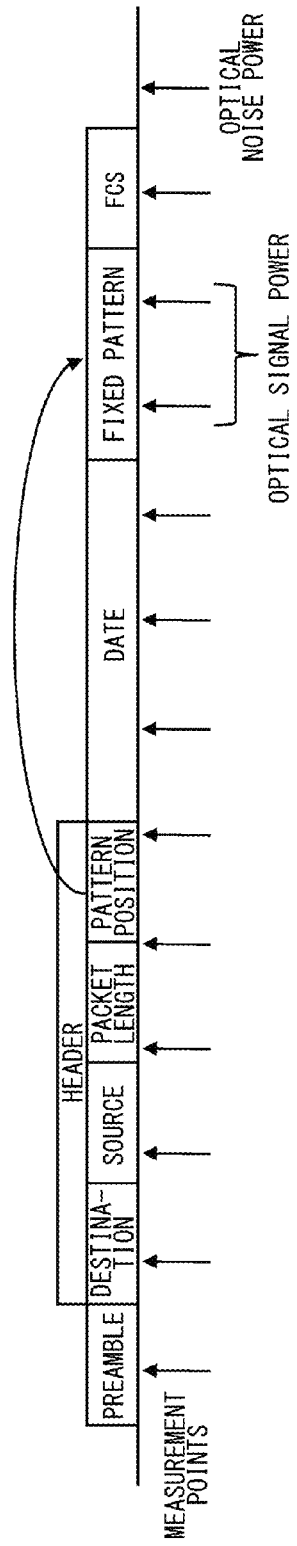
FIG. 16 is a diagram for explaining still another method for measuring the optical signal power.

FIG. 16 is a diagram for explaining still another method for measuring the optical signal power. In the method, for measuring the optical signal power, described in conjunction with FIG. 15, the position where the fixed pattern is inserted is fixed relative to the header. Consider, however, a case where the peak power varies among different places, namely among the leading portion, the middle portion and the rearmost portion of an optical packet signal, due to the effect of a transient response of the optical-to-electrical converter or the optical amplifier, for instance. In this case, arises a need for measurement of the optical signal-to-noise ratio at each point. In order to cope with this need, a method for placing the fixed pattern in an arbitrary position is described hereunder.

In this method, when generating an optical packet signal, the optical packet generator not only inserts a fixed pattern in an arbitrary position within the optical packet signal but also appends the positional information on the fixed pattern to the header of this optical packet signal. Then the optical signal-to-noise ratio measuring unit measures the optical power of the fixed pattern based on the positional information on the fixed pattern and outputs this optical power as the optical signal power. In the example of the FIG. 16, the fixed pattern is measured at two measurement points. However, it goes without saying that the fixed pattern may be measured at a signal measurement point. Where the optical power of the fixed pattern is measured at two or more measurement points, it is only necessary to calculate an average value of them as the optical signal power.

By employing this method, the optical signal-to-noise ratios at arbitrary positions can be measured even if the optical packet signal is a variable-length packet signal. Note that the fixed pattern is information superfluous to the client signal and therefore the fixed patter needs to be discarded by optical packet receiver.

A description is now given of a method for measuring the optical noise power. In the example shown in FIG. 6D, the optical packet switching unit is controlled such that the optical noise remains behind the optical signal. Instead, the optical packet switching unit may be controlled such that the optical noise remains anterior to the optical signal. Also, the optical packet switching unit may be controlled such that the optical noise remains both anterior to and posterior to the optical signal. The optical signal-to-noise ratio measuring unit preferably obtains the optical power with the timing at which the optical noise is present. The time width of optical noise depends on the sampling speed of the optical signal-to-noise ratio measuring unit; if the sampling speed thereof is faster, the time width thereof may be shorter. Since the power level of the optical noise is lower than that of the optical signal, the time width may be longer than the measurement time of the fixed pattern.

Figure 17:
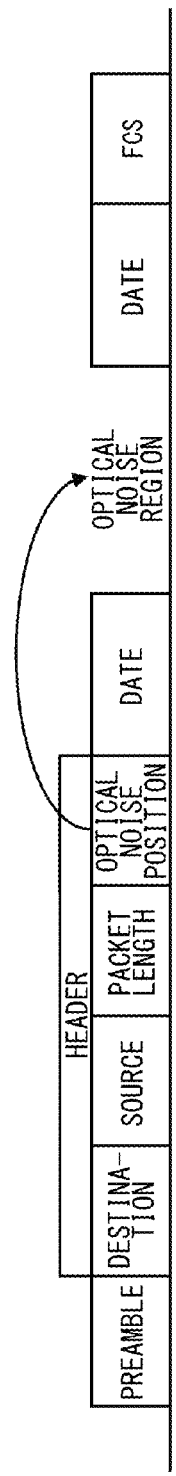
FIG. 17 shows an example of a format of an optical packet signal used in a method for setting a measurement point of optical noise power at an arbitrary position.

Now a description will be given of a method for setting a measurement point of optical noise power at an arbitrary position. FIG. 17 shows an example of a format of an optical packet signal used in this method. In this method, the optical packet generator inserts a "optical noise region" for the measurement of optical noise power at an arbitrary position within an optical packet signal when generating the optical packet signal. This optical noise region is a region where no data bits are present. Also, the optical packet generator attaches the positional information on the optical noise region to the header of the optical packet signal in order to inform the optical signal-to-noise ratio measuring unit and the like of the position of the optical noise region.

Figure 18:
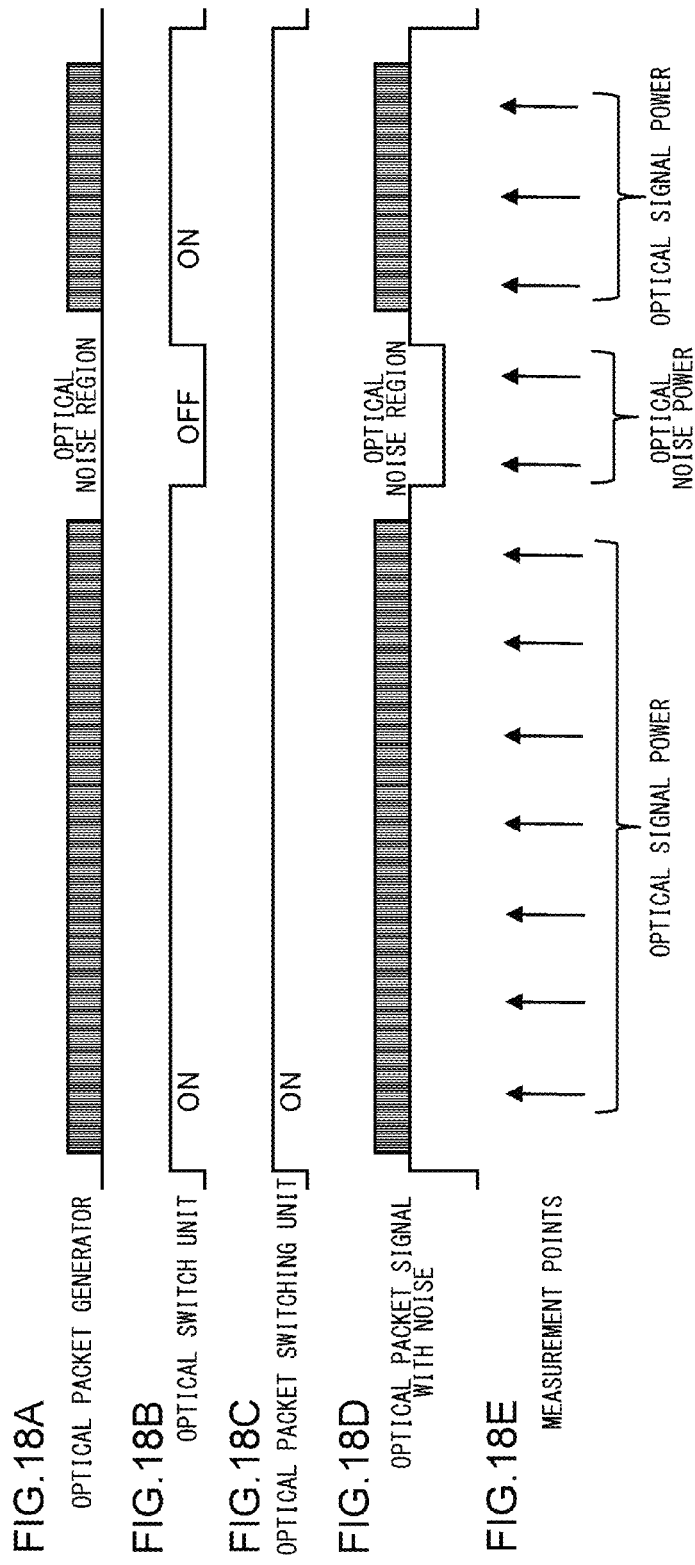
FIGS. 18A to 18E are diagrams for explaining operations of constituent elements in a method for setting a measurement point of optical noise power at an arbitrary position.

FIGS. 18A to 18E are diagrams for explaining the operations of the constituent elements of this method. FIG. 18A shows an optical packet signal generated by the optical packet generator. This optical packet signal is the same as one explained in FIG. 17 and has an optical noise region set in an optional position within the signal.

FIG. 18B shows an operation of the optical switching unit provided at a stage subsequent to the optical packet generator. As described already, the optical switching unit keeps the optical switch on during the time when the optical packet signal is present, but turns the optical switch off in the optical noise region. As a result, the extinction ratio of the signal part can be raised.

FIG. 18C shows an operation of the optical packet switching unit. The optical packet switching unit keeps the optical switch on during the time when the optical packet signal is present. The optical packet switching unit maintains the on-state of the optical switch even in the optical noise region. As a result, an optical packet signal with optical noise as shown in FIG. 18D is outputted from the optical packet switching unit. An optical packet signal with optical noise having a waveform as shown in FIG. 18C reaches the optical signal-to-noise ratio measuring unit.

FIG. 18E shows measurement points of optical noise power. The optical signal-to-noise ratio measuring unit reads positional information on the optical noise region from the header of the optical packet signal with optical noise and takes in the optical power in the optical noise region based on the positional information. Then the optical signal-to-noise ratio measuring unit calculates the optical signal-to-noise ratio, using the thus taken-in optical power as the optical noise power.

With optical packet signals of long packet length, there are cases where the optical signal-to-noise ratio changes depending on the position within the signal. According to the present method, the optical signal-to-noise ratio at an arbitrary position within the optical packet signal can be measured.

When an optical packet signal is transferred through a plurality of stations, the optical signal power tends to have a certain range of fluctuations due to the accumulation of variations resulting from the distance of transmission paths between stations and gains of optical amplifiers. As for the optical noise, which is almost nonexistent at the transmitting end, the optical power is very weak at the beginning, but has a very wide fluctuation range because the optical noise keeps increasing with every passage of the signal through each optical amplifier.

In the measurement of the powers of optical signal and optical noise, the accuracy of measurement can be assured if the optical power is strong. If, however, the optical power is weak, the necessity may arise to raise the amplification factor of an optical monitoring circuit. Raising the amplification factor, however, deteriorates frequency response, and if the accuracy of measurement is to be retained, it is necessary to use sufficiently long time for the measurement of optical signal and optical noise. Accordingly, a description will be given here of a method using variable time width for the measurement of optical signal or optical noise.

Figure 19:
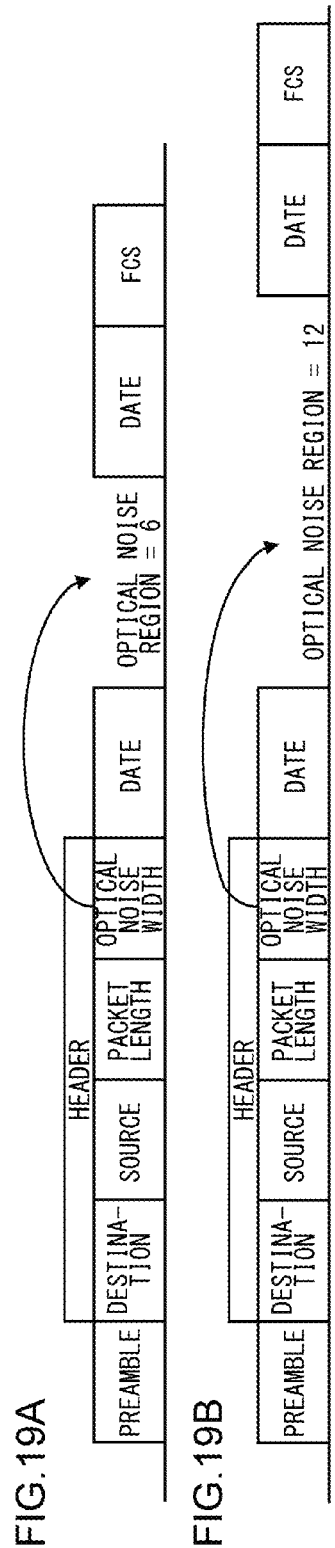
FIGS. 19A and 19B are diagrams for explaining a method using variable time width for the measurement of optical noise.

FIGS. 19A and 19B are diagrams for explaining a method using variable time width for the measurement of optical noise. In this method, the optical packet generator inserts a noise light region in an arbitrary position within an optical packet signal when generating the optical packet signal. In this method, the optical packet generator can change the time width of the optical noise region. Also, the optical packet generator attaches information indicating the time width of the optical noise region to the header of the optical packet signal. FIG. 19A shows an example of a format of an optical packet signal whose time width of the optical noise region is 6 (arbitrary unit). Also, FIG. 19B shows another example of a format of an optical packet signal whose time width of the optical noise region is 12 (arbitrary unit). Note that the information to be attached to the header of the optical packet signal may be the positional information on the optical noise region explained with FIG. 17 also.

Thus, employing the variable time width of optical noise region allows control that uses a longer time width of optical noise region when the optical noise power is small or a shorter time width of optical noise region when the optical noise power is large, for instance.

In this method, the optical switch unit and the optical packet switching unit perform the on/off control of the optical switch in consideration of the time width of optical noise region. Also, the optical signal-to-noise ratio measuring unit determines the time duration that can be used in the measurement of the optical power of the optical noise region based on the length information on the optical noise region and measures the optical power of the optical noise region by using this time duration. To enhance the accuracy of measurement, it is preferable that as many measurement points as practicably possible are set within the time width of the optical noise region.

With reference to FIGS. 19A and 19B, a description has been given of a case where the time width of optical noise is variable. However, the arrangement may also be such that the time width of optical signal is variable with the length of the fixed pattern changed, and the time width information on the optical signal is attached to the header of the optical packet signal. This will improve the accuracy of measurement of the optical signal power and consequently improve the accuracy of measurement of the optical signal-to-noise ratio. Or the arrangement may also be such that the time width for both of the optical signal and the optical noise can be varied. In this case, the accuracy of measurement of the optical signal-to-noise ratio will be further improved.

In this method, which of the time widths produces the best result is yet to be determined by actual measurements. In cases where the measurements are to be conducted under the guidance of the maintenance entity of the equipment, a measurement should be taken at a certain time width and the adequacy of the measurement result should be determined. Then, if the accuracy is considered less than adequate, another measurement should be performed using a longer time width.

Or in cases where the measurement of the optical signal-to-noise ratio is be made autonomously on a regular basis, an optimum time width may be sought by changing the time width repeatedly through a number of measurements.

Or the accuracy information on the measurement result or the dispersion information on the measurement result obtained by the optical signal-to-noise ratio measuring unit may be fed back to the optical packet generator. More specifically, when an optical packet signal with insufficient accuracy is found as a result of ascertaining the accuracy information or the dispersion information, the optical packet generator assigns a longer time width of the optical signal and/or the optical noise to the next optical packet signal and on. This will improve the measurement of the optical signal-to-noise ratio.

Figure 20:
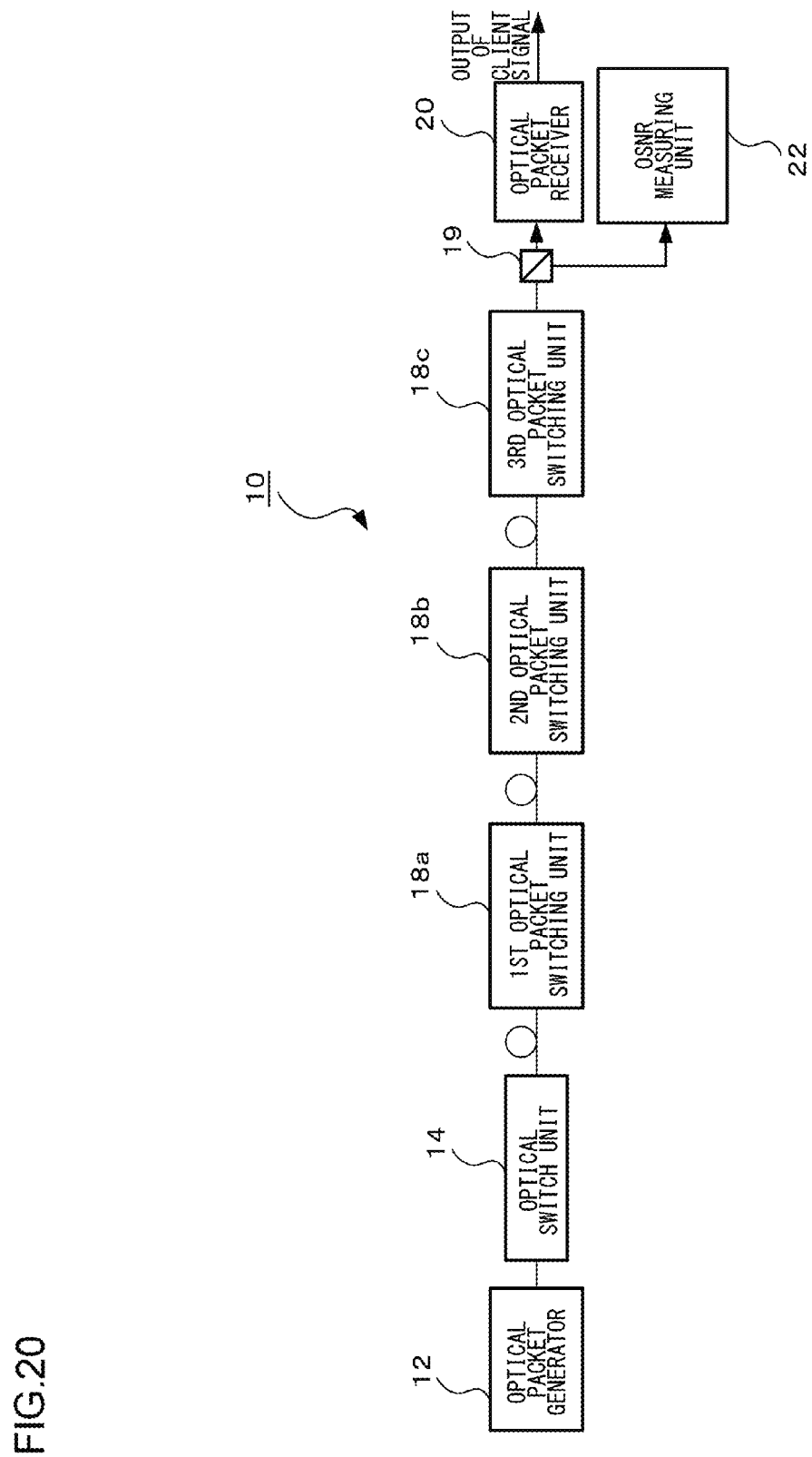
FIG. 20 is a diagram showing another structure of an optical packet switching system.

FIG. 20 is a diagram showing another structure of the optical packet switching system 10. Components of the optical packet switching system 10 shown in FIG. 20, which are identical to or correspond to those of the optical packet switching system shown in FIG. 4, are given the same reference numerals herein and the repeated description thereof are omitted as appropriate.

In the optical packet switching system 10 shown in FIG. 20, three optical packet switching units, which are a first optical packet switching unit 18a, a second optical packet switching unit 18b and a third optical packet switching unit 18c, are connected in series with each other at a stage subsequent to the optical packet generator 12. The optical packet receiver 20 and the optical signal-to-noise ratio measuring unit 22 are provided at a stage subsequent to the third optical packet switching unit 18c.

In this configuration, there occurs a phenomenon in which as an optical packet signal passes through a plurality of stages of optical packet switching units, noise increases gradually. A description is here given of a method wherein no optical signal-to-noise ratio measuring unit is placed immediately after each of the optical packet switching units and wherein the optical signal-to-noise ratio of the optical packet signal outputted from each of the optical packet switching unit is measured at a single measurement point.

Figure 21:
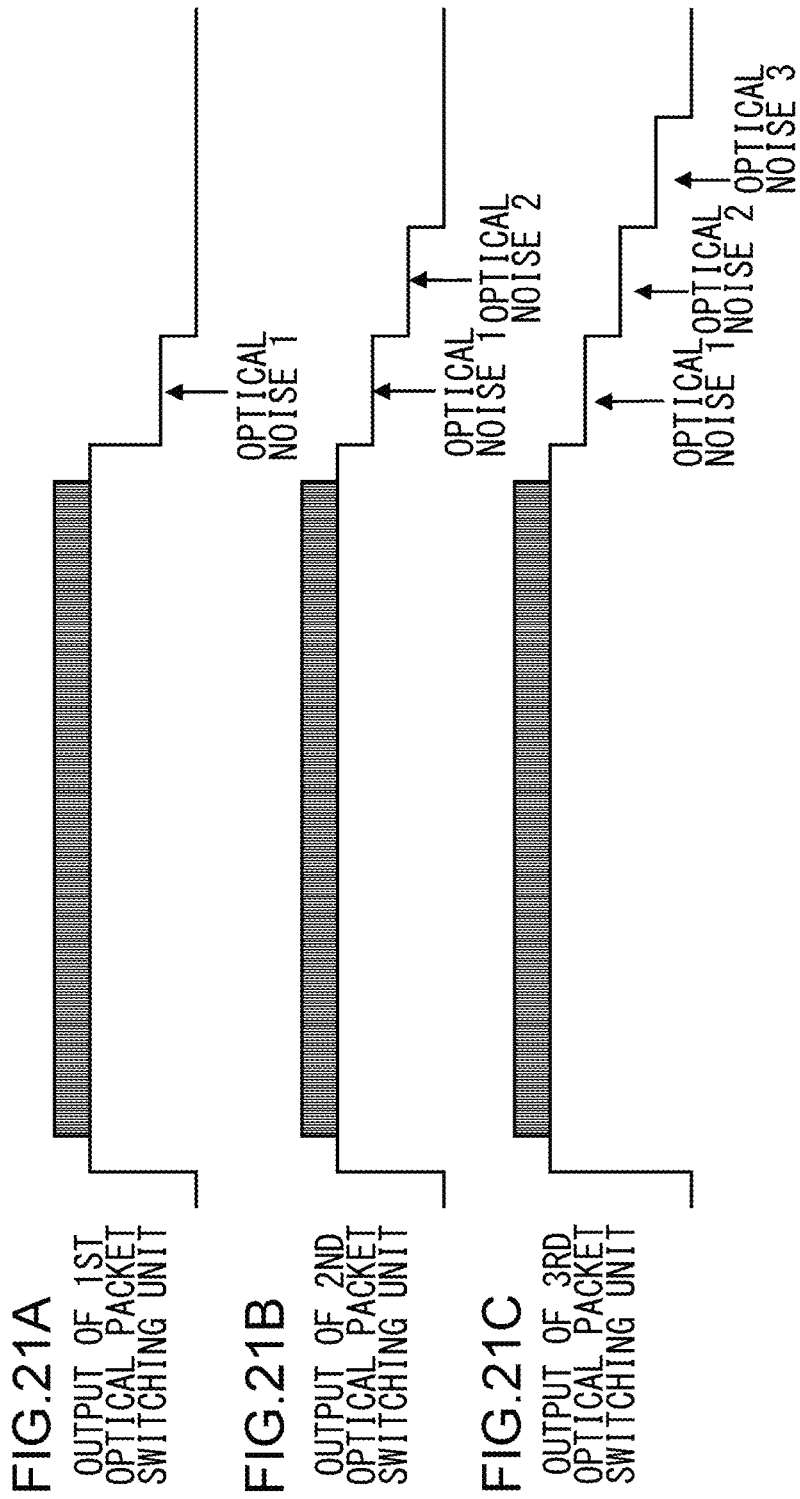
FIG. 21A to FIG. 21C are diagrams for explaining a method for measuring the optical signal-to-noise ratio of an optical packet signal outputted from each optical packet switching unit at a measurement point.

FIG. 21A to FIG. 21C are diagrams for explaining a method, for measuring the optical signal-to-noise ratio of an optical packet signal, according to this method. In this method, the time length of on-state of the optical switch is made longer gradually starting from the optical packet switching unit 18 located upstream towards the optical packet switching unit 18 located downstream, when the route of the optical packet signal is switched. FIG. 21A shows an optical packet signal with optical noise outputted from the first optical packet switching unit 18a. The first optical packet switching unit 18a keeps the optical switch on longer than the length of the optical packet signal, thereby adding a first optical noise. This first optical noise is an optical noise added as the signal passes through the first optical packet switching unit 18a.

FIG. 21B shows an optical packet signal with optical noise outputted from the second optical packet switching unit 18b. The second optical packet switching unit 18b keeps the optical switch on longer than the time length during which the first optical packet switching unit 18a is turned on. Thereby, a second optical noise is added after the first optical noise. This second optical noise is an optical noise added as the signal passes through the second optical packet switching unit 18b.

FIG. 21C shows an optical packet signal with optical noise outputted from the third optical packet switching unit 18c. The third optical packet switching unit 18c keeps the optical switch on longer than the time length during which the second optical packet switching unit 18b is turned on. Thereby, a third optical noise is added after the second optical noise. This third optical noise is an optical noise added as the signal passes through the third optical packet switching unit 18c.

The optical packet signal with optical noise where the optical noise power varies in a staircase pattern as shown in FIG. 21C is inputted to the optical signal-to-noise ratio measuring unit 22. The optical signal-to-noise ratio measuring unit 22 measures the optical noise powers for the first to third optical noises, respectively, and calculates the optical signal-to-noise ratios using the respective optical noise powers measured. As a result, the optical signal-to-noise ratio of the optical packet signal outputted from each of the optical packet switching unit can be measured at a single measurement point.

Note that unless each optical packet switching unit is aware of at which stage it is located in this staircase pattern, the difference cannot be set to the time length during which each optical packet switching unit is turned on. As regards this problem, conceivable is a method where a number of spans are set beforehand to an optical switching unit corresponding to the transmission route if the maintenance person is to issue a measurement start instruction, for instance. Also, assume here that the arrangement is such that the optical signal-to-noise ratio is autonomously measured at a constant frequency. Then each optical switching unit obtains a number of spans counted up to when the optical packet signal reaches its own optical switching unit from the source and stores the thus obtained number of spans in a table in such a manner, for example, that the information is exchanged between the adjacent optical switching units. In this case, conceivable is a method where the optical switch is controlled by referencing this table when the optical packet signal actually arrives.

In the optical packet switching system according to the present embodiment, optical noise is added to the actual data packet received from a client and thereby the optical signal-to-noise ratio is measured for each optical packet signal. This allows in-service measurement without cutting off the communication. However, if the measurement depends on a client signal, the packets will be transmitted to only a terminal apparatus to which the client signal is destined and therefore there may remain places with holes or the like where no measurement is conducted. If the optical packet signal reaches such a place with a hole, the optical signal-to-noise ratio will be not satisfactory and therefore the packet discarding may occur there. This cannot be said to assure the quality.

In the light of the foregoing, a method may be employed where the measurement does not depend on the client signal and an optical packet signal for exclusive use in measurement of the optical signal-to-noise ratio is generated and transmitted at the optical packet generator.

There is no need to transmit an optical packet signal to a route where the measurement is being conducted. Thus, if there is any route where no measurement is conducted for a certain period of time, packets may be transmitted by unicast to a terminal apparatus located ahead on said route. Also, if there are a plurality of measurement routes, the packets may be transmitted by multicast. Also, a method may be employed where the optical signal-to-noise ratios may be measured in the entire area covered, regardless of whether the measurement is being then conduced or not, by broadcasting the packets to all of the terminal apparatuses. This method has the advantage that the optical signal-to-noise ratio is measured even for a newly added terminal apparatus as well.

Figure 22:
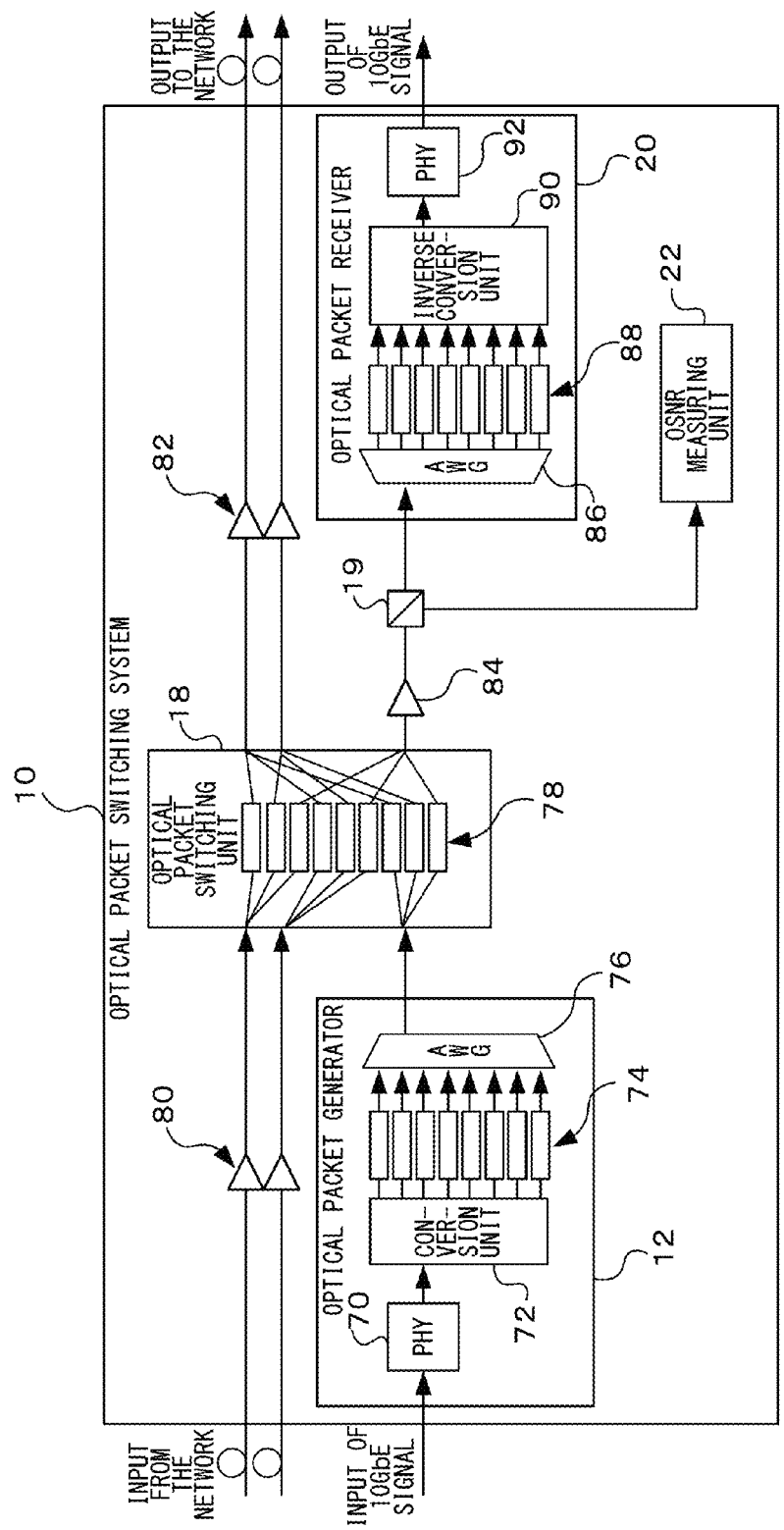
FIG. 22 is a diagram showing an optical packet switching system according to an exemplary embodiment of the present invention.

A description is now given of an exemplary embodiment of the present invention. FIG. 22 is a diagram showing an optical packet switching system 10 according to the present exemplary embodiment. As shown in FIG. 22, the optical packet switching system 10 includes an optical packet generator 12, an optical packet switching unit 18, an optical branching unit 19, an optical packet receiver 20, and an optical signal-to-noise ratio measuring unit 22.

The optical packet switching unit 18 includes a physical layer (PHY) 70 that receives a client signal, which is a 10 GEther signal, and converts the client signal into an electrical signal, a conversion unit 72 that divides the 10 GEther signal and then coverts it into a plurality of packet signals, a plurality of electro-absorption (EA)-modulated transmitters 74 that convert the plurality of packet signals into a plurality of optical packet signals, and an arrayed-waveguide grating (AWG) 76 that wavelength-multiplexes the plurality of optical packet signals.

The wavelength-multiplexed optical packet signal outputted from the optical packet generator 12 is inputted to the optical packet switching unit 18. An optical packet signal fed from the optical packet network is amplified by an optical amplifier 80 and then the amplified optical packet signal is inputted to the optical packet switching unit 18. The optical packet switching unit 18, provided with a plurality of semiconductor optical amplifier (SOA) gates 78, switches the route of the inputted optical packet signal by controlling the on/off of these SOA gates 78. An optical switch using the SOA gate has the response speed on the order of nanoseconds (ns). The optical packet signal transferred to another optical packet switching system is amplified by an optical amplifier 82 and then the amplified optical packet signal is outputted to the optical packet network. At the same time, the optical packet signal dropped at the optical packet receiver 20 of its own station is amplified by an optical amplifier 84 and then the amplified optical packet signal is inputted to the optical branching unit 19. Optical packets bifurcated by the optical branching unit 19 are inputted to the optical packet receiver 20 and the optical signal-to-noise ratio measuring unit 22, respectively.

The optical packet receiver 20 includes an AWG 86 that demultiplexes the inputted wavelength-multiplexed optical signal, a PIN type receiver 88 that converts optical packet signals of a plurality of wavelengths fed from the AWG 86 into electrical signals, an inverse conversion unit 90 that performs an inverse conversion on a plurality of packet signals so as to assemble a 10 GEther signal, and a physical layer 92 that converts the electrical 10 GEther signal into an optical signal and outputs the optical signal to the client side.

Figure 23:
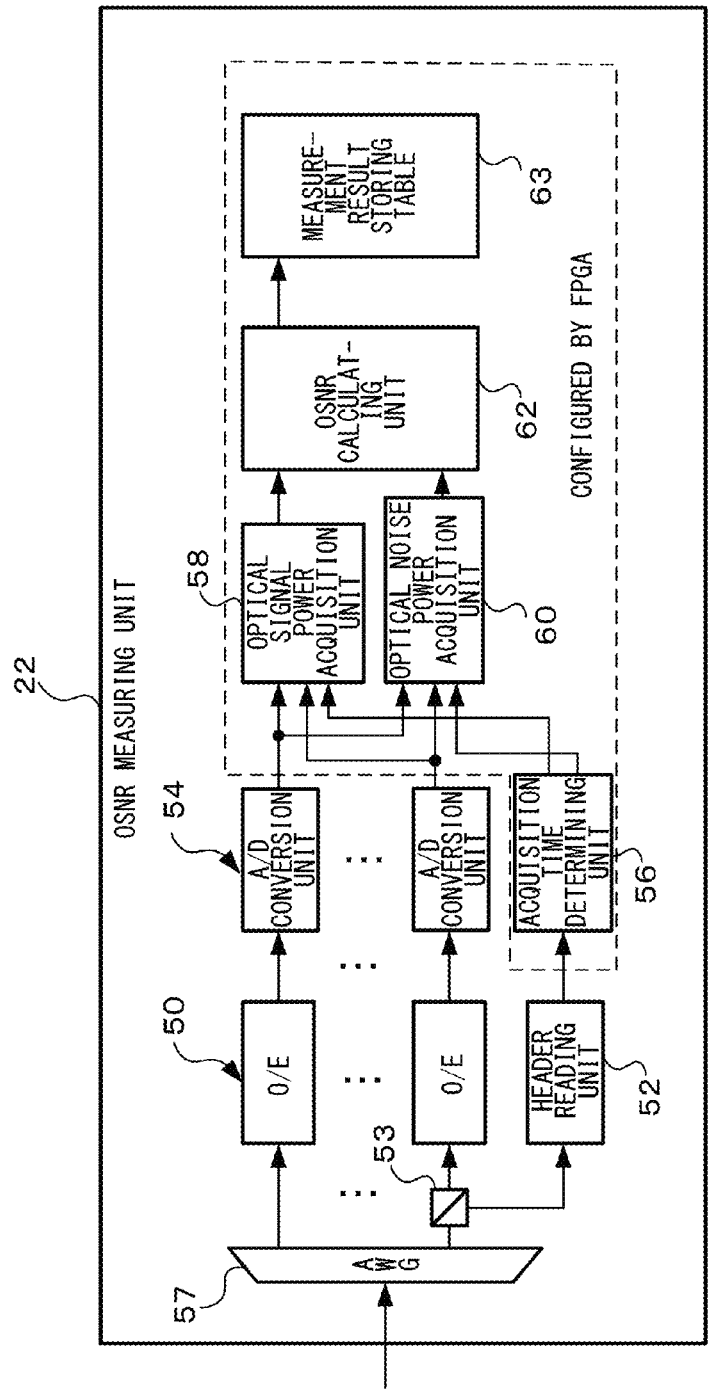
FIG. 23 is a diagram showing an optical signal-to-noise ratio measuring unit according to an exemplary embodiment of the present invention.

FIG. 23 is a diagram showing an optical signal-to-noise ratio measuring unit 22 according to the present exemplary embodiment. The optical signal-to-noise ratio measuring unit 22 includes an AWG 57 functioning as a wavelength demultiplexing unit, a plurality of optical-to-electrical (E/O) converters 50, a header reading unit 52, a plurality of A/D converters 54, a retrieval time determining unit 56, a optical signal power acquisition unit 58, a optical noise power acquisition unit 60, an optical signal-to-noise ratio calculating unit 62, and a measurement result storing table 63. The structure according to the present exemplary embodiment is similar to the structure implemented for the measurement of the optical signal-to-noise ratio of the wavelength-multiplexed optical packet signal described in conjunction with FIG. 11.

The structure according to the present exemplary embodiment is such that the an optical packet signal of a wavelength, to which a header is assigned, is bifurcated by an optical branching unit 53 so as to be inputted to the optical-to-electrical converter 50 and the header reading unit 52. Thereby, the optical signal-to-noise ratio of the optical packet signal of the wavelength to which the header is assigned can measured, too. Since the optical signal-to-noise ratio measuring unit 22 according to the present exemplary embodiment has the measurement result storing table 63 for storing the optical signal-to-noise ratios measured by the optical signal-to-noise ratio calculating unit 62. The retrieval time determining unit 56, the optical signal power acquisition unit 58, the optical noise power acquisition unit 60, the optical signal-to-noise ratio calculating unit 62, and the measurement result storing table 63 may each be configured by using a field programmable gate array (FPGA) and the like.

In the present exemplary embodiment, the AWG 57 has a plurality of components that are configured to demultiplex the optical packet signal for each wavelength. However, having a plurality of wideband measurement circuits like this may not be practical or may even cause some difficulties in terms of cost. In such a case, a single measurement circuit may be used and a band-pass filter may be used in substitution for the AWG 57. Hence, the wavelengths to be measured can be separated off individually and therefore the measurement may be conducted per wavelength.

Figure 24:
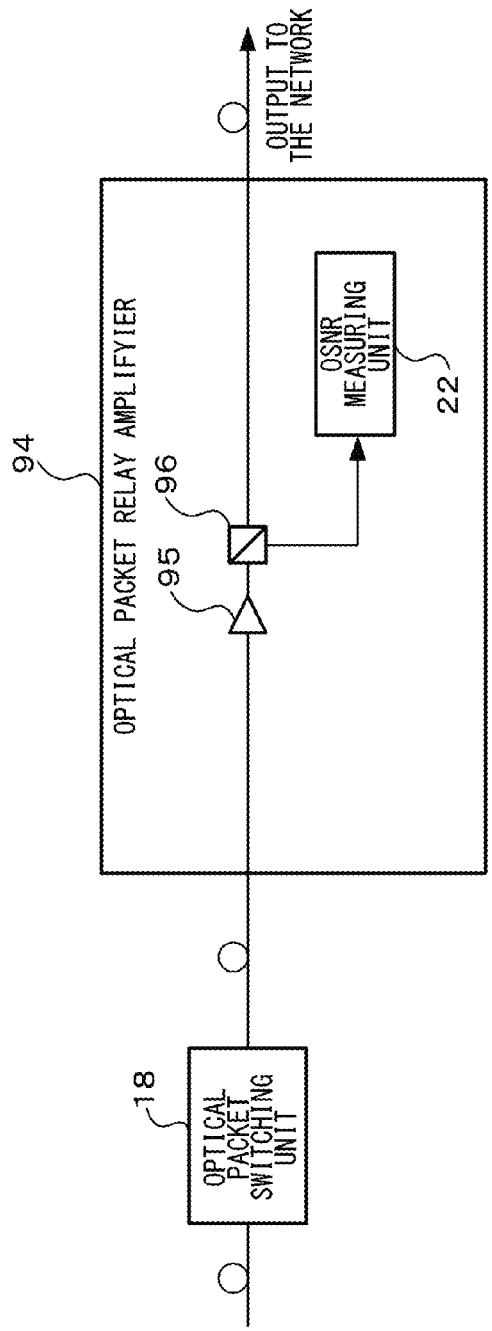
FIG. 24 shows an exemplary embodiment where an optical signal-to-noise ratio measuring unit is provided in an optical packet relay amplifier.

FIG. 24 shows an exemplary embodiment where an optical signal-to-noise ratio measuring unit 22 is provided in an optical packet relay amplifier 94. As long as the optical signal-to-noise ratio measuring unit 22 is located downstream of the optical packet switching unit 18, the optical signal-to-noise ratio measuring unit 22 can be placed in any of various positions.

As shown in FIG. 24, the optical packet relay amplifier 94 includes an optical amplifier 95, an optical branching unit 96, and an optical signal-to-noise ratio measuring unit 22. An optical packet signal with optical noise outputted from the optical packet switching unit 18 is inputted to the optical packet relay amplifier 94. The optical packet signal with optical noise is amplified by the optical amplifier 95 and then the amplified optical packet signal with optical noise is bifurcated by the optical branching unit 96. One of the bifurcated optical packet signals with optical noise is outputted to the optical packet network. The other of the bifurcated optical packet signals with optical noise is inputted to the optical signal-to-noise ratio measuring unit 22 where the optical signal-to-noise ratio thereof is measured. The optical signal-to-noise ratio measuring unit 22 according to the present exemplary embodiment may be configured the same manner as the optical signal-to-noise ratio measuring unit described in conjunction with FIG. 23.

The present invention has been described based upon illustrative embodiments. The above-described embodiments are intended to be illustrative only and it will be obvious to those skilled in the art that various modifications to the combination of constituting elements and processes could be further developed and that such modifications are also within the scope of the present invention.

What is claimed is:

1. An optical packet switching system comprising: an optical packet generator configured to generate an optical packet signal; an optical packet switching unit, provided with an optical switch, configured to switch a route of an inputted optical packet signal by controlling on/off of the optical switch; and an optical signal-to-noise ratio measuring unit configured to measure an optical signal-to-noise ratio of the optical packet signal outputted from the optical packet switching unit, wherein, when switching the route of the optical packet signal, the optical packet switching unit outputs an optical packet signal with optical noise by keeping the optical switch on for a time length that is longer than the time width of the packet signal, and wherein the optical signal-to-noise ratio measuring unit measures an optical signal power and an optical noise power, respectively, in the optical packet signal with optical noise and measures the optical signal-to-noise ratio by calculating the ratio between the optical signal power and the optical noise power.

2. The optical packet switching system according to claim 1, further comprising an optical switch unit configured to raise an extinction ratio of the optical packet signal, the optical switch unit being provided at a stage subsequent to the optical packet generator.

3. The optical packet switching system according to claim 1, wherein the optical signal-to-noise ratio measuring unit identifies the optical signal and the optical noise in the optical packet signal with optical noise, based on the arrival time of the optical packet signal and optical packet length information attached to the optical packet signal, and measures the respective powers of the optical signal and the optical noise.

4. The optical packet switching system according to claim 1, wherein the optical packet signal is a wavelength-multiplexed optical packet signal where optical packet signals of a plurality of wavelengths are wavelength-multiplexed, and
wherein the optical signal-to-noise ratio measuring unit demultiplexes the inputted wavelength-multiplexed packet signal into the optical packet signals of a plurality of wavelengths and then measures the optical signal-to-noise ratio of the optical packet signal of each of the plurality of wavelength.

5. The optical packet switching system according to claim 1, wherein, when generating an optical packet signal, the optical packet generator appends information bit to said optical packet signal, the information bit indicating whether the optical signal-to-noise ratio is to be measured or not, wherein, when the information bit of the inputted optical packet signal indicates that the optical signal-to-noise ratio is to be measured, the optical packet switching unit outputs the optical packet signal with optical noise, and wherein, when the information bit of the inputted optical packet signal indicates that the optical signal-to-noise ratio is to be measured, the optical signal-to-noise ratio measuring unit measures the optical signal-to-noise ratio.

6. The optical packet switching system according to claim 5, wherein the optical packet generator periodically appends information bit, which indicates whether the optical signal-to-noise ratio is to be measured, to the optical packet signal.

7. The optical packet switching system according to claim 5, wherein the optical packet generator appends information bit measurement instruction information, which indicates whether the optical signal-to-noise ratio is to be measured, to the optical packet signal according to an instruction given externally.

8. The optical packet switching system according to claim 1, wherein the optical signal-to-noise ratio measurement unit has a storage that is configured to store the optical signal-to-noise ratio of the measured optical packet signal in a manner such that source information on said measured optical packet signal and the arrival time of said optical packet signal are associated with each other.

9. The optical packet switching system according to claim 1, wherein the optical signal-to-noise ratio measuring unit measures the optical power of signal part at a plurality of measurement points over a time width of the optical packet signal, and measures the optical signal-to-noise ratio by using an average value of the measured optical powers as the optical power.

10. The optical packet switching system according to claim 1, wherein, when generating an optical packet signal, the optical packet generator inserts a fixed pattern in a predetermined position of the optical packet signal, and wherein the optical signal-to-noise ratio measuring unit measures the optical power of the fixed pattern and calculates the optical signal-to-noise ratio by using the measured optical power as the optical signal power.

11. The optical packet switching system according to claim 1, wherein, when generating an optical packet signal, the optical packet generator inserts a fixed pattern in an arbitrary position within the optical packet signal and appends positional information on the fixed pattern to a header of the optical packet signal, and wherein the optical signal-to-noise ratio measuring unit measures the optical power of the fixed pattern based on the positional information on the fixed pattern and calculates the optical signal-to-noise ratio by using the measured optical power as the optical signal power.

12. The optical packet switching system according to claim 10, wherein the optical packet generator varies the length of the fixed pattern and appends length information on the fixed pattern to a header of the optical packet signal, and wherein the optical signal-to-noise ratio measuring unit measures the optical power of the fixed pattern based on the length information on the fixed pattern and calculates the optical signal-to-noise ratio by using the measured optical power as the optical signal power.

13. The optical packet switching system according to claim 1, wherein the optical packet switching unit controls the optical switch in such a manner the optical noise is added before and/or after the optical packet, and wherein the optical signal-to-noise ratio measuring unit measures the power of the optical noise that is added before and/or after the optical packet, and calculates the optical signal-to-noise ratio by using the measured power as the optical noise power.

14. The optical packet switching system according to claim 1, wherein, when generating an optical packet signal, the optical packet generator inserts a optical noise region, used to measure the optical noise power, in an arbitrary position within the optical packet signal and appends positional information on the optical noise region to a header of the optical packet signal, and wherein the optical signal-to-noise ratio measuring unit measures the optical power of the optical noise region based on the positional information on the optical noise region and calculates the optical signal-to-noise ratio by using the measured optical power as the optical noise power.

15. The optical packet switching system according to claim 14, wherein the optical packet generator varies the length of the optical noise region and appends length information on the optical noise region to the header of the optical packet signal, and wherein the optical signal-to-noise ratio measuring unit measures the optical power of the optical noise region based on the length information on the optical noise region and calculates the optical signal-to-noise ratio by using the measured optical power as the optical noise power.

16. The optical packet switching system according to claim 13, wherein a plurality of the optical packet switching units are provided at a stage subsequent to the optical packet generator, wherein the plurality of the optical packet switching units generate the optical packet signal with noise where the optical noise power varies in a staircase pattern, in a manner such that the time length of on-state of the optical switch is made longer gradually starting from the optical packet switching unit located upstream towards the optical packet switching unit located downstream, wherein the optical signal-to-noise ratio measuring unit measures the optical noise power varied in the staircase pattern in the optical packet signal with noise, and calculates the optical signal-to-noise ratio for each output from each of the optical packet switching units by using the measured power.

17. The optical packet switching system according to claim 1, wherein the optical packet generator, the optical packet switching unit and the optical signal-to-noise ratio measuring unit constitute a terminal apparatus, wherein an optical packet switching network is configured by connecting together a plurality of the terminal apparatuses, and wherein an optical switch generator in one of the plurality of the terminal apparatuses generates an optical packet signal for use in measurement of the optical signal-to-noise ratio, and the optical packet signal generated by the optical switch generator is transmitted by unicast, multicast or broadcast to another terminal apparatus.

* * * * *